(12) United States Patent
Hisada et al.

(10) Patent No.: US 7,701,639 B2
(45) Date of Patent: Apr. 20, 2010

(54) PROJECTION TYPE IMAGE DISPLAY APPARATUS

(75) Inventors: Takanori Hisada, Yokohama (JP); Koji Hirata, Yokohama (JP); Masahiko Yatsu, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/870,646

(22) Filed: Oct. 11, 2007

(65) Prior Publication Data

US 2008/0100927 A1    May 1, 2008

(30) Foreign Application Priority Data

Oct. 13, 2006    (JP)    ............................. 2006-279451

(51) Int. Cl.
*G02B 3/00* (2006.01)
*G02B 9/00* (2006.01)
*G02B 13/18* (2006.01)
*G02B 3/02* (2006.01)

(52) U.S. Cl. ...................................... 359/649; 359/717

(58) Field of Classification Search ......... 359/649–651, 359/708, 77, 720, 726, 728
See application file for complete search history.

(56) References Cited

U.S. PATENT DOCUMENTS

| 5,648,871 | A | 7/1997 | Okuyama et al. |
| 2004/0257666 | A1 | 12/2004 | Komatsu et al. |
| 2006/0227299 | A1 | 10/2006 | Hisada et al. |

FOREIGN PATENT DOCUMENTS

| CN | 1717608 A | 1/2006 |
| CN | 1845001 A | 10/2006 |
| JP | 05-134213 | 5/1993 |
| JP | 2004-157560 | 6/2004 |

*Primary Examiner*—Alicia M Harrington
(74) *Attorney, Agent, or Firm*—Antonelli, Terry, Stout & Kraus, LLP.

(57) ABSTRACT

A projection-type display apparatus, comprises a front lens group having a plural number of lenses, each having rotationally symmetric surface configuration, a rear lens group, being disposed in rear of the front lens group, including a refractive lens for diverting a light and having a rotationally symmetric surface configuration, and a plural number of free curved surface lenses, each having a rotationally asymmetric free curved surface configuration, and a reflection mirror, being disposed in rear of the rear lens group, having a convex configuration into a direction of reflection of light and a rotationally asymmetric free curved surface configuration, at least in a part thereof.

7 Claims, 16 Drawing Sheets

FIG.3(a) CROSS-SECTION IN VERTICAL DIRECTION

FIG.3(b) CROSS-SECTION IN HORIZONTAL DIRECTION

PROJECTION TYPE IMAGE DISPLAY APPARATUS

BACKGROUND OF THE INVENTION

The present invention relates to an optical unit and a projection-type displaying apparatus using the optical unit therein, for conducting image display by projecting an image from a image display element(s), enlargedly, upon a screen.

In Japanese Patent Laying-Open No. Hei 5-134213 (1993), for example, is already disclosed a technology for projecting an image on a screen into the direction inclined or oblique to the screen, while shifting the projection screen into the direction perpendicular to an optical axis of a projection system, with using an additional optic system, being disposed by inclining by a predetermined angle with respect to that optical axis of the projection system.

Also, in Japanese Patent Laying-Open No. 2004-157560 (2004), for example, there is already disclosed a reflection-type image forming optical system, for projecting an image on the image display element(s) onto the screen (i.e., the tracing surface), enlargedly, with using a plural number of reflection mirrors.

BRIEF SUMMARY OF THE INVENTION

When projecting an image onto the screen from direction inclined thereto, then trapezoidal distortion is generated on the projected image. For dissolving this, within structures of the projection optic unit, described in the Japanese Patent Laying-Open No. Hei 5-134213 (1993), the trapezoidal distortion is suppressed with bringing the additional optic system (i.e., the afocal converter) to be eccentric, which is disposed on a screen side. The additional optical system mentioned herein is an optical system having a function of converting the sizes of the projection image, and it is for compensating and/or reducing the distortion of the projection image accompanying with the projection from the direction oblique to the screen, thereby obtaining a rectangular projection image. However, for lenses for building up such the eccentric additional optic system, it is difficult to widen the lens angle thereof since the magnification thereof is low, and for that reason, it is necessary to make the distance long from the projection apparatus up to the screen, for obtaining a projection image to have a necessary magnification, and also, the distance is long between the projection screen and the projection system, and further there is a problem that the entire of the apparatus comes to be large (in particular, the length indirection of an optical axis of the optic unit). In addition to the above, it is necessary to provide an additional optic system having a large aperture, as a lens for building up the additional optic eccentric additional optic system mentioned above, but accompanying this, it also results into a reason of rising up the costs of the projection optic unit.

On the other hand, with the reflection-type image forming optic system described in the Japanese Patent Laying-Open No. 2004-157560 (2004), it aims to obtain a wide angle of view while suppressing large-sizing of the image forming optic system, with applying the reflection-type image forming optic system (i.e., reflection mirrors) in the place of the conventional image forming optic system of transmission type. However, because an amount of eccentricity (or deflection) is large upon the reflection mirror, it is difficult to dispose a plural number of reflection mirrors at correct positions, including inclining angles thereof, and also the inclining angles of the reflection mirrors can be changed, easily, due to vibration, within an apparatus, and therefore it is very difficult to manufacture the apparatus.

Then, an aspect according to the present invention is to build up a rear lens group with a refractive lens for diverging a light, having a rotationally symmetric surface-like shape, and a plural pieces of free-surface lenses, each being in an asymmetric free-surface configuration.

BRIEF DESCRIPTION OF THE DRAWINGS

Those and other objects, features and advantages of the present invention will become more readily apparent from the following detailed description when taken in conjunction with the accompanying drawings wherein:

FIG. 6 is a view for showing the condition when shifting a rear lens group, within a projection type display apparatus;

DETAILED DESCRIPTION OF PREFERRED EMBODIMENTS

Hereinafter, embodiments according to the present invention will be fully explained by referring to the attached drawings.

Embodiment 1

Figure 1:
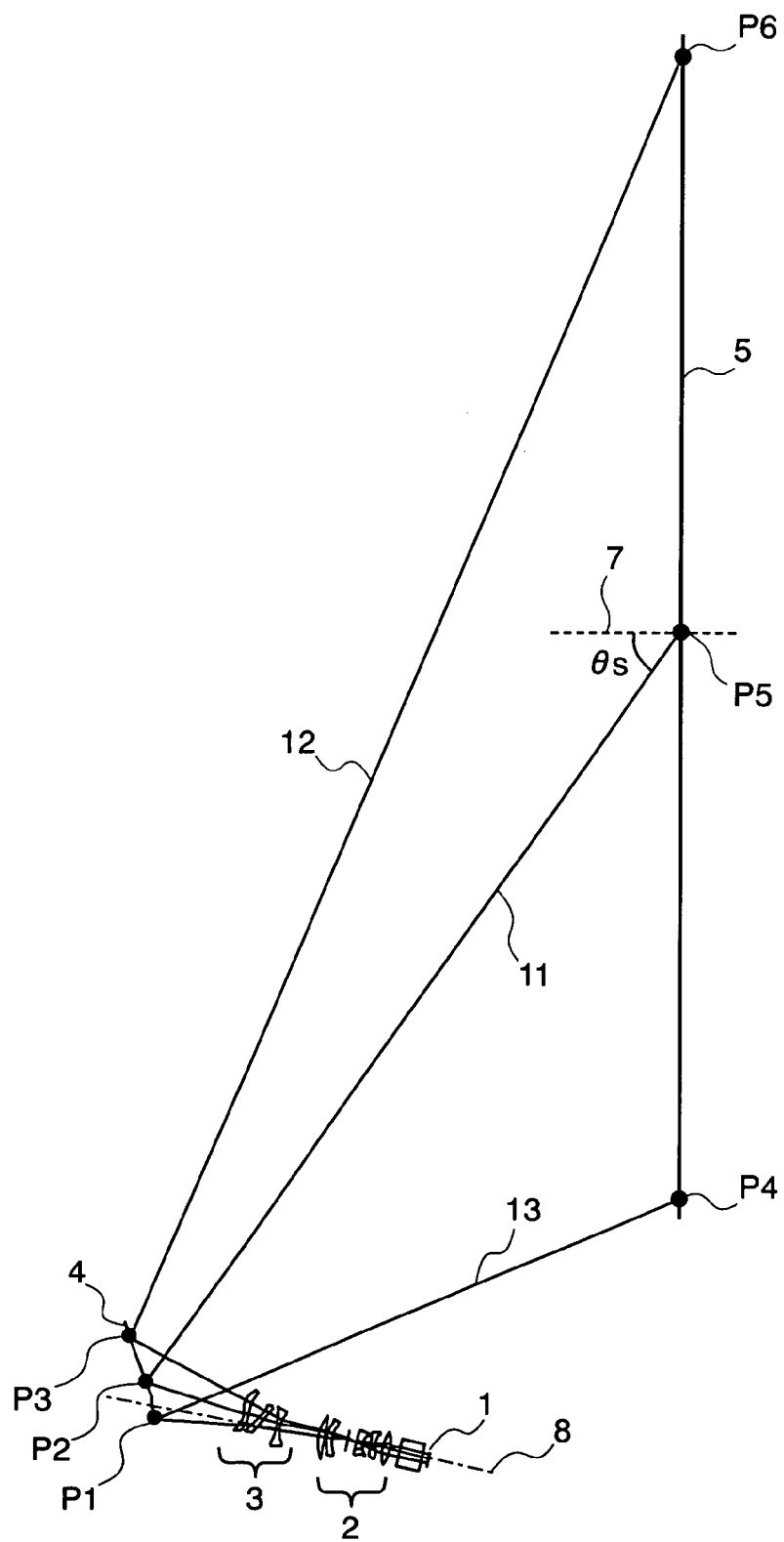
FIG. 1 is a cress-section view of an optical unit, according to the embodiment 1 of the present invention.

First of all, FIG. 1 attached herewith is a cross-section view for showing an optical unit, according to an embodiment 1, wherein the optical system is shown by a Y-Z cress-section view within XYZ rectangular coordinates.

As is shown in FIG. 1, the optical unit according to the embodiment 1 is built up with an image display element 1 for modulating a light from a light source 8 into an optical image depending on an image signal and a prism, a transmitting (i.e., lens) optic system, which is formed by two (2) pieces of lens groups, including a front lens group 2 and a rear lens group 3, and a reflection optical system, including a reflection mirror (hereinafter, being called a "free-curved mirror"), which has a reflection surface of free-curved configuration, being not symmetric (i.e., rotationally asymmetric).

Herein, as the image display element 1, though is shown an example of applying a transmission type, such as, a liquid crystal panel, representatively, for example, however the present invention should not be restricted only to this, and it may be a self-emission type, such as, a CRT, for example. Also, in case when applying the transmission type, such as, the above-mentioned liquid crystal panel or the like, for example, it is necessary to provide a lamp, to be a light source 8 for irradiating the liquid crystal panel. Also, as such the liquid crystal panel, it may be a so-called three (3) plates type, forming images of R, G and B, and in that case, it is necessary to provide a prism or the like, for use of synthesizing an image. However, an illustration is omitted herein, in particular, about the details of those liquid crystal panels and the light source 8 for irradiating them, which will be explained later, since they do not relate directly. On the other hand, with the self-emission type, such as, the CRT, it is apparent that there is no need of such the light source 8 as was mentioned above.

Within the optical unit according to the embodiment 1, the light emitted from the image display element 1 is firstly incident upon the front lens group 2 building up the lens optic system. Though the details thereof will be explained later, but this front lens group 2 is constructed with a plural number of refractive lenses, each having a rotationally symmetric surface configuration of a positive or a negative power. Herein, the positive power means a function of converging a light, while the negative power a function diverging the light. Thereafter, the light emitted from this front lens group 2 passes through the rear lens group 3, which is constructed with a plural number of lenses, including a plural number (two (2) pieces in this example) of lenses, each having the sculptured or free curved surface at least on one surface thereof, i.e., not rotationally symmetric (rotationally asymmetric). And, the light emitted from this rear lens group 3, further after being reflected enlargedly, upon a reflection optic system, including the reflection mirror (hereinafter, being called "free curved (or sculptured) surface mirror") 4, having the reflection surface of the free curved surface, not rotationally symmetric, it is projected onto a predetermined screen 5 (for example, a wall surface of a room or a sheet-like screen, etc.).

However, within the embodiment 1, as is apparent from this FIG. 1, differing from the optic system shifting the projection screen (i.e., the display element) into the direction perpendicular to the optical axis of the projection system, and further disposing the additional optic system inclined by a predetermined angle with respect to the optical axis of the projection system, as disclosed in the Patent Document 1, the image display element 1 is so arranged that a center of the display screen thereof is approximately positioned on the optical axis of the optic system (i.e., nearly defining a coaxial optic system). Accordingly, the light beam 11 directing to a center of the image on the screen 5, emitting from a center of the display surface of the image display element 1 and passing through a center of an entrance pupil of the lens optic system (hereinafter, those will be called a "image center light"), propagates along the optical axis of the lens optic system (including the front lens group 2 and the rear lens group 3 mentioned above), approximately. Thereafter, this image center light 11, after being reflected at a point P2 upon the reflection surface 4 having the free curved surface of the reflection optic system (including the sculptured surface mirror), is incident upon a point 5 at a center of the image on the screen 5, obliquely, from a lower side with respect to a normal line 7 on the screen. Hereinafter, this angle is called an "oblique incident angle" and is presented by "θs". This means that, the light passing along the optical axis of the lens optic system is incident upon the screen, inclining to the screen, and it is substantially equal to provide the optical axis of the lens system inclining to the screen (i.e., an oblique incidence system).

However, as was mentioned above, an oblique incidence of the light upon the screen produces various kinds of aberrations, including so-called a trapezoidal distortion, i.e., an oblong configuration of projection from the image display element 1 becomes a trapezoid, and also other than that, due to the rotational asymmetry to the optical axis, etc., but according to the present invention, those are compensated upon the reflection surfaces of the rear lens group 3, which builds up the lens optic system mentioned above, and also those of the reflection optic system.

In particular, with the oblique incidence of the light projected from the image display element 1 mentioned above upon the screen 5, after being reflected upon the reflection surface of the reflection mirror 4 building up the reflection optic system mentioned above, since it enables to obtain an eccentricity (i.e., the deflection angle) much larger, being much larger comparing to that obtained through the lenses building up the lens optic system, and also it hardly produces the aberrations, therefore it is possible to suppress large-sizing of the apparatus, as well as, to obtain the wide angle of view. Thus, it is possible to build up the lens optic system, including the front lens group 2 and the rear lens group 3 mentioned above, as an optic system to be much smaller in the aperture thereof, comparing to that of the structures offsetting the additional optic system (i.e., an afocal converter) of the conventional technology mentioned above, thereby suppressing the trapezoidal distortion.

Also, projecting the light incident upon the reflection surface of the reflection mirror 4, which builds up the reflection optic system, while widening an angle thereof up to a predetermined largeness or sizes, by letting the rear lens group to bear that angle widening function in a part thereof, due to including the lens having the negative power therein, as was mentioned above, manufacturing thereof comes to be easy, comparing to the conventional structures, building up an enlarging projection system with only the reflection mirror. Thus, the lens optic system is manufactured, separately from the reflection optic system, and thereafter it is fixed within a housing of the apparatus with adjusting the positions of both of those; i.e., it is suitable for mass production, in particular.

Also, with disposing the rear lens group 3 for compensating the trapezoidal distortion, etc., in front of the above-mentioned front lens group 2, as was mentioned above, since the rear lens group 3 and the front lens group 2 can be disposed while reducing the distance between them, it is possible to achieve the apparatus, being compact, as a whole thereof, mounting the said projection optic unit therein, and also to obtain a preferable effect of enabling to reduce the height, in particular, below the screen.

In this manner, combining the transmission type lens optic unit having the free curved surface and the reflection optic system having the free curved surface, in particular, in case when applying it into an image display apparatus of a front projection type, it is possible to obtain an optic system being compact, small-sizing the apparatus as a whole, while achieving the wide angle of view, which is strongly required for that front projection type, with certainty and relatively easily.

Figure 2:
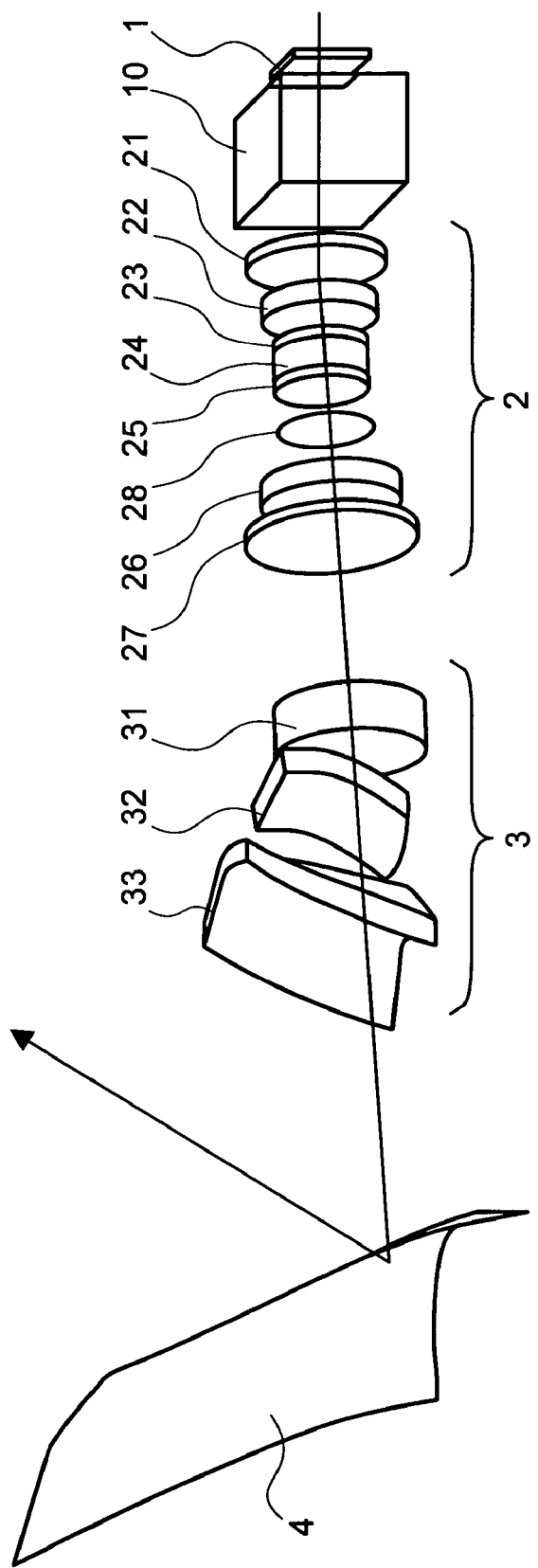
FIG. 2 is a perspective view for showing an example of an arrangement of lenses of the optical unit, according to the embodiment 1.
Figure 3:
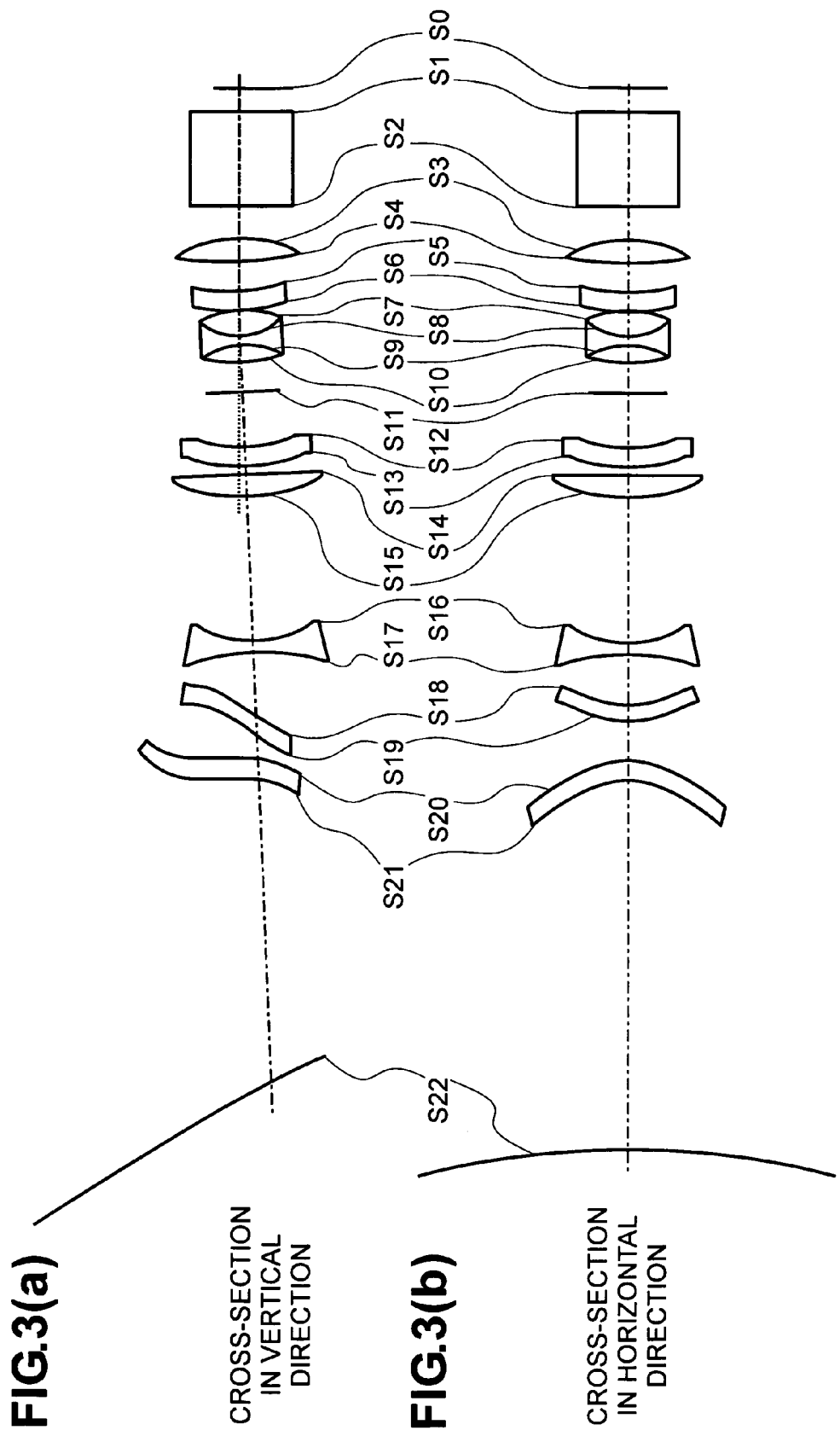
FIGS. 3(a) and 3(b) are cross-section views in the vertical direction and the horizontal direction of the lenses of the optical unit.

Next, FIG. 2 and FIGS. 3(*a*) and 3(*b*) show the lens surfaces of optical elements within the projection optic unit, including the reflection optic system therein. Thus, FIG. 2 is a perspective view of the projection optic system mentioned above, and FIG. 3(*a*) shows a cross-section in the vertical direction thereof, while FIG. 3(*b*) a cross-section in the horizontal direction thereof, respectively.

As is shown in those figures, within the lens optic system, an image emitted from the image display element 1 through the prism 10 is firstly incident upon the front lens group 2, including a plural number of lenses therein, which has the rotationally symmetric configuration. As was mentioned above, the front lens group 2 includes a spherical lens, being rotationally symmetric, and also an aspheric lens therein. Or, as will be mentioned later by referring to FIG. 13 and/or FIG. 14, a bending mirror may be disposed on the way between the front lens group 2 and the rear lens group 3, so as to bend the light at a right angle.

Also, the rear lens group 3 is constructed with at least two (2) pieces of free curved or sculptured surface lenses. As is shown in those figures, when seeing it from the cross-section in the horizontal direction, a free curved surface lens 33, nearest to the reflection surface S22 of the reflection mirror 4, directs a concave into the direction of light emission, and a curvature of a portion, where the light passes through to be incident upon a low end of that screen, is determined to be larger than that of a portion, where the light passes through to be incident upon an upper end of that screen. Thus, it is assumed that, the free curved or sculptured surface lens has such a configuration, i.e., being curved directing the concave into the direction of emission of that light, and having the curvature in the portion where the light passes through to be incident upon the low end of that screen, being larger than that in a portion where the light passes through to be incident upon the upper end of that screen.

Also, according to the embodiment 1, it is constructed to fulfill the following condition. Thus, within the cross-section shown in FIG. 1, it is assumed that the light incident upon a point P6 at an upper end of picture on the screen 5, being emitted from a lower end of screen on the image display element 1 and passing through a center of the entrance pupil of the front lens group 2, is a light 12. It is assumed that an optical path length is "L1" for this light 12 to reach the point P6 from a point P3 where this light 12 passes through the free curved surface mirror 4. Also, it is assumed that the light incident upon a point P4 at the lower end of picture on the screen 5 is a light 13, being emitted from the upper end of screen of the image display element 1 and passing through the center of the entrance pupil of the front lens group 2. It is assumed that the optical pass length is "L2" for this light 13 to reach the point P4 from the point P1 where this light 13 passes through the free curved surface mirror 4. And, the projection optic unit mentioned above is so constructed that the "L1" and the "L2" satisfy the following equation (Eq. 1):

$$|L1-L2|<1.2*\sin\theta s*Dv$$

However, where "Dv" is a size of the picture on the screen, within the cross-section shown in FIG. 1, and in other words, it is a distance from the point P6 at the upper end of picture to the point P4 at the lower end thereof on the screen. Also, "θs" is the oblique incident angle mentioned above.

On the other hand, although the image display element 1 mentioned above is disposed in such a manner that the center of the display screen or image thereof is located on the optical axis of the lens optic system mentioned above, or alternatively, it is preferable to dispose it in such a manner that the normal line on the said display image is inclined a little bit to the optical axis of the lens optic system mentioned above, as is shown in FIG. 3(*a*) attached herewith.

Further, seeing FIG. 1, as was mentioned previously, the optical path length reaching from the point P3 to the point P6 is longer than the optical path length reaching from the point P1 to the point P4. This means that the image point P6 is farther from than the image point P4. Then, if an object point (i.e., a point in the display image) corresponding to the image point P6 on the screen is located at a point nearer to the lens optic system and also if an object point corresponding to the image point P4 is located at a position farther from the lens optic system, it is possible to compensate the inclination of an image surface. For that purpose, it is preferable to incline a normal line vector at a center on the display image of the image display element 1, a little bit, as is shown in FIG. 3(*a*), with respect to the optical axis of the lens optic system, within a plane defined to include the normal line of the screen 5 and the light at the center of the image therein. And, it is preferable that the direction of that inclination is opposite to the direction into which the screen 5 is positioned.

Further, a method for inclining an abject surface for the purpose of obtaining an image surface inclined to the optical axis, however within a practical region of the angle of view, deformations asymmetric to the optical axis are produced upon the image surface, which is obtained through the inclination of the object surface, and therefore it is difficult to make compensation by means of a projection lens, which is rotationally symmetric. According to the embodiment 1, because of applying the free curved surface lens 31 and further also the free curved surface lens 32, which are rotationally asymmetric, within the rear lens group 3 mentioned above, it is possible to treat with the deformations upon the asymmetric image surface. For this reason, inclination of the object surface, i.e., the display surface of the image display element, enables to reduce the distortions of low dimensions on the image surface, greatly, and therefore it is effective for assisting the compensation of aberrations due to the free curved surface.

Next, with the function of each of the optical elements mentioned above, in particular, within the lens optic system mentioned above, the front lens group 2 (i.e., lenses 21 to 27), they build up a main lens for projecting the display image of the image display element 1 onto the screen 5, and also compensate the basic aberrations within the optic system that is rotationally symmetric. And, the rear lens group 3 (i.e., lenses 31 to 33) within the lens optic system mentioned above, they are made up with lenses, each having the free curved surface, being not rotationally symmetric (i.e., rotationally asymmetric). Further, since the reflection optic system 4 mentioned above is built up with the reflection surfaces, each having the free curved surface configuration that is not rotationally symmetric, then it mainly compensates the aberration, which is produced due to the oblique incidence of the light. Thus, within such the structures as was mentioned above, the mirror 4 building up the reflection optic system mentioned above mainly compensates the trapezoidal distortion, while the rear lens group 3 of the lens optic system mainly compensate the asymmetric aberrations, such as, the distortion on the image surface, etc.

As was mentioned above, according to the embodiment 1, the reflection optic system mentioned above is built up with one (1) piece of the reflection surface (i.e., mirror) 4 having the free curved surface configuration that is not rotationally symmetric, while the rear lens group 3 of the lens optic system includes two (2) pieces of the transmission-type lenses (i.e., the lenses 31 and 32 on the side of reflection mirror 4), in the structures thereof. Herein, the free curved surface mirror 4 is curved directing a convex into the direction of reflection. And, a curvature on a portion of the free curved surface mirror 4, reflecting the light to be incident upon a lower end of the screen, is determined to be larger than the curvature of a portion thereof, reflecting the light to be incident upon an upper end of the screen. Or, a portion reflecting the light to be incident upon the lower end of the screen may be defined into a configuration convex to the reflecting direction of the light, on the other hand, a portion reflecting the light to be incident upon the upper end of the screen into a configuration concave to the reflecting direction thereof.

Figure 4:
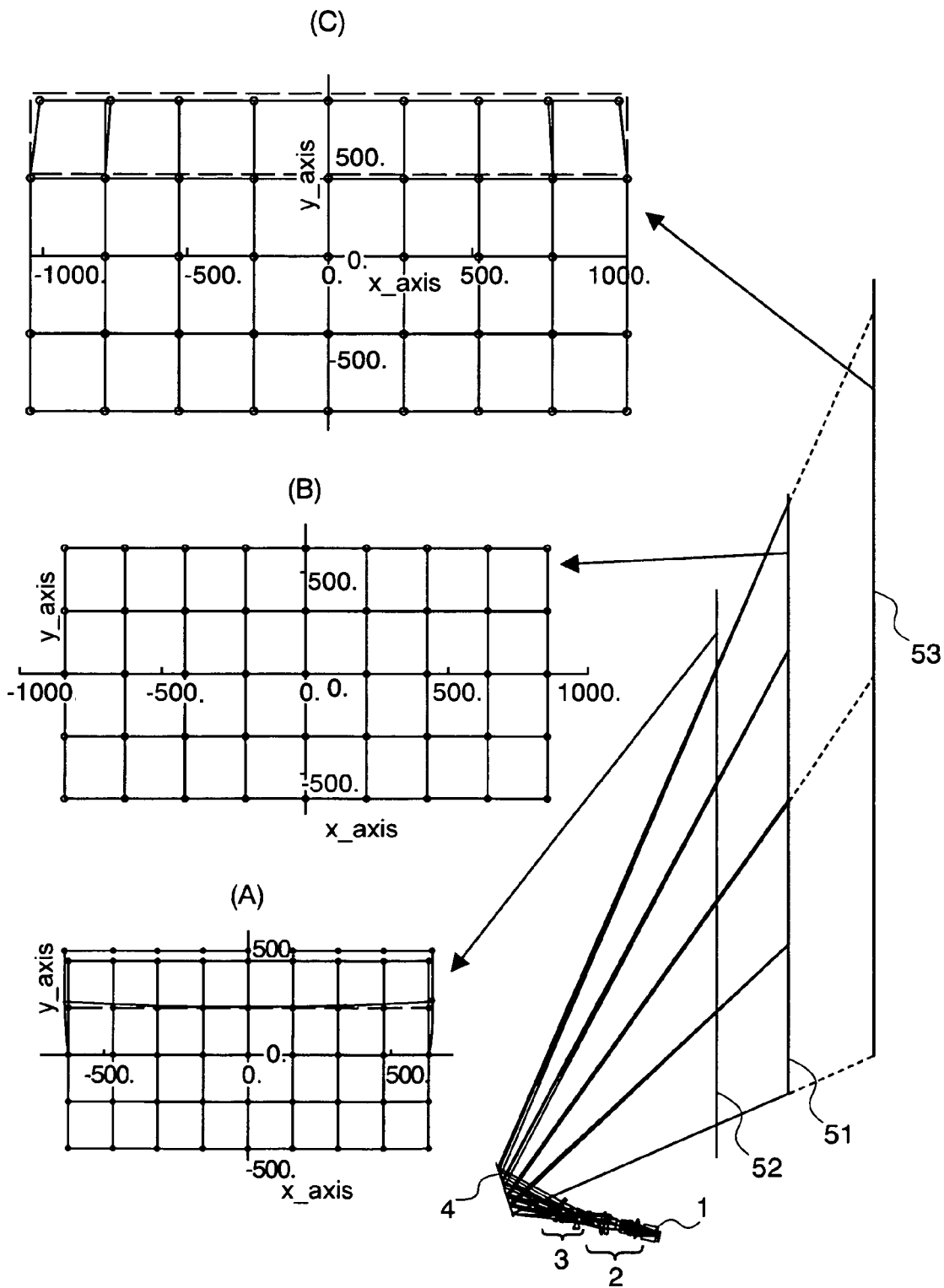
FIG. 4 is a view for showing conditions of the structures and a picture distortion in case when changing a projection distance, within a projection type display apparatus, applying the optical unit according to the embodiment 1, therein.

Next, FIG. 4 shows therein a problem, within an optic system of a method of obliquely projecting, i.e., inclining the optical axis thereof to the screen, and in particular, in case when changing the distance from the optical unit to the screen. Thus, as is shown in FIG. 4, in case when moving the screen position, largely, from the designed position thereof, thereby trying to change the projection distance greatly, it is possible to bring in focus by an adjustment, such as, changing the distance between the panel and the lens, etc., in the rotationally symmetric optic system not projecting obliquely, and the screen distortion does not change greatly; however in the optic system applying the method of obliquely projection the light inclining the optical axis thereof to the screen, the distortion becomes large, and also, as is shown in FIG. 5, the spot size also becomes large, then the picture quality thereof is greatly deteriorated.

In FIG. 4 are shown the conditions of the picture distortions, in case when locating the position of the screen 5 at a position 52 in the direction for reducing the projection image, from the design position 51 (i.e., designed screen size, for example, corresponding to 80 inches), and locating it at a position 53 in the direction for enlarging the image (for example, corresponding to 100 inches), respectively. In this FIG. 4, (A) shows the picture distortion at the screen position 52, (B) the screen distortion at the screen position 51, and (C) the picture distortion at the screen position 53, respectively.

Figure 5:
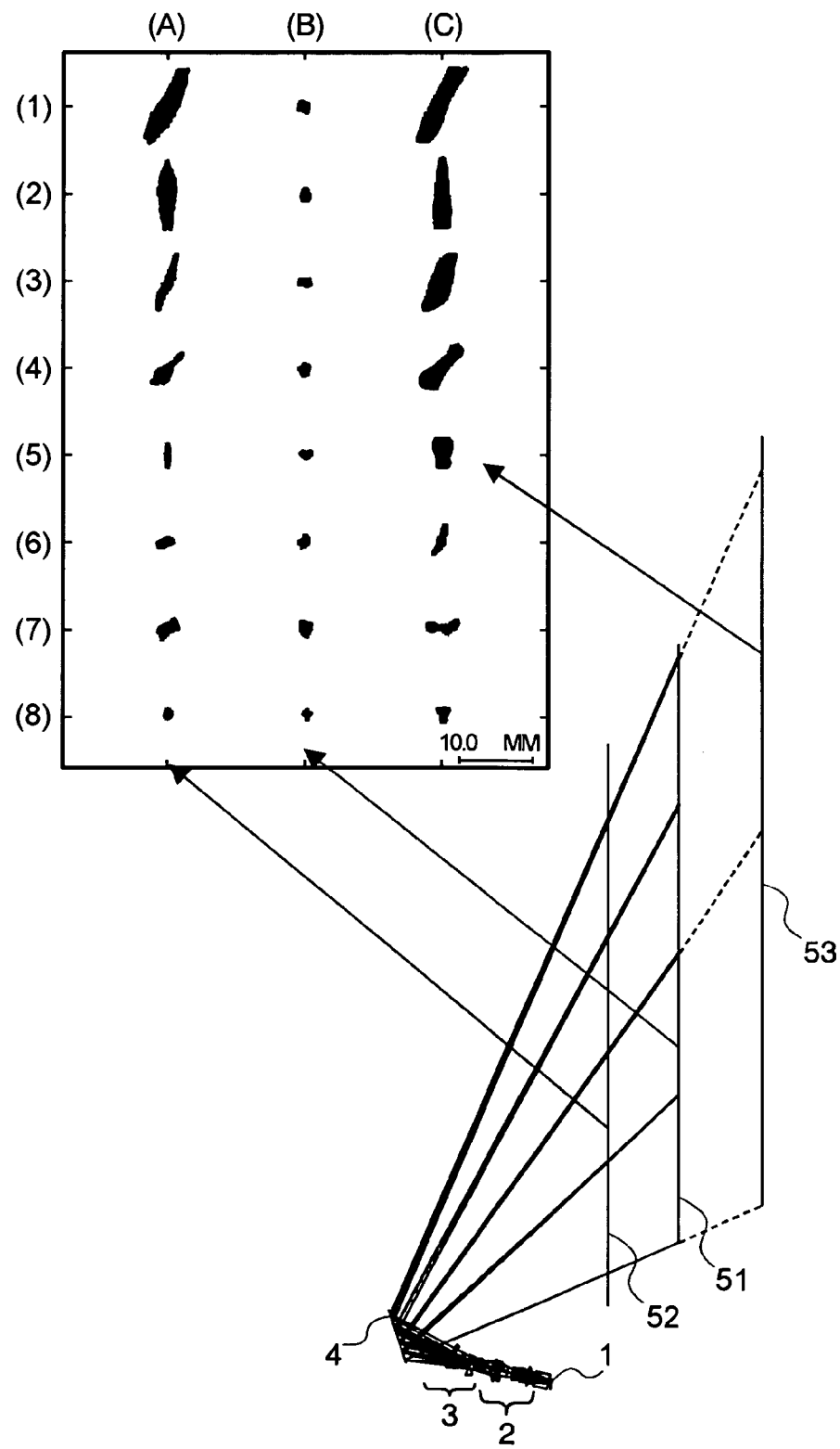
FIG. 5 is a view for showing condition of spots in case when changing a projection distance, within a projection type display apparatus, applying the optical unit according to the embodiment 1, therein.

In FIG. 5, there are shown spot configurations at eight (8) points on the screen or image, but at three (3) different screen positions, similar to that shown in FIG. 4. Those eight (8) points include eight (8) points, i.e., (0.5, 0.5), (0, 0.5), (0.3, 0.3), (0.5, 0), (0, 0), (0.3, −0.3), (0.5, −0.5), and (0, −0.5), i.e., being described with the horizontal axis X, which is normalized by horizontal screen width, and vertical axis Y, which is normalized by vertical screen height, surrounding the point of original at the center of the screen or image, and they are shown by (1) to (8) in FIG. 5, from the top thereof, in the sequential order thereof. Herein, the Y-axis is positive directing into an upper direction in FIG. 5, in the vertical direction of the screen or image. Also, in FIG. 5, (A) shows the spot configurations at the screen position 52, (B) the spot configurations at the screen position 51, and (C) the spot configurations at the screen position 53, respectively. As apparent from those, the distortion grows up in the magnitude or size thereof, to be large, approximately up to be equal 2% or greater than the height or width of the screen or image, and the spot configuration also comes to be equal as 5 times large or more as that when the screen is at the designed position, i.e., deteriorating in the resolution capacity.

An increase of the spot size disables the spot configurations to be made preferable on the entire screen or image, even when moving the potion of the panel back and forth to be in focus. The reason of that lies in, as is shown in FIG. 5, that an increasing amount of the spot size differs depending on the position on the screen or image, and the optic system is not rotationally symmetric, even if brining a part of the screen or image to be in focus, with movement of the panel or the rotational asymmetric lens, but the other portion comes out from the condition of being in focus. It is also difficult to correct this spot configuration, with the movement of only the lenses 32 and 33 of the rear lens group, building up the free curved surface lens. This is because shifting of the focus point accompanying with the great movement of the screen position necessitates a power of the rotational symmetric lens.

Then, it is found out that a projection optic system can be obtained, which generates no deterioration in performances responding to change of the projection distance, by bringing the configuration to be most suitable, so as to obtain a superior balancing in the performances at the various projection distances, including other lens(es) not moving.

Upon selection of the lens to be moved, as a result of moving the lens corresponding to the movement or shifting of the screen position, and thereby making a search on a lens, which brings about an effect of improving the distortion on the spot configuration and/or the resolution capacity, it is found out that, in particular, it is effective to shift the transmission lenses 32 having the free curved surface, and also the transmission lens 33, independently, as well as, the lens 31 having the negative power, which builds up the rear lens group, respectively, by a predetermined distance into the direction of the optical axis. Further, it is also effective to move the mirror 4 having the free curved surface. However, there are many difficulties to move the mirror 4, which is disposed to be inclined and also has the free curved surface being relatively large in the size, from a viewpoint of the structures of that apparatus, and therefore, in particular, it is effective to move the lenses 31 to 33 building up the rear lens group 3.

Figure 6A:
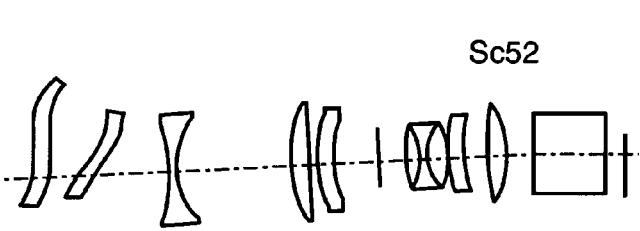
FIGS. 6(a) to 6(c) are views for showing the condition when shifting a rear lens group, within a projection type display apparatus.
Figure 6B:
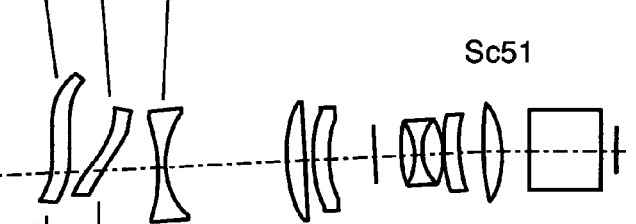
Figure 6C:
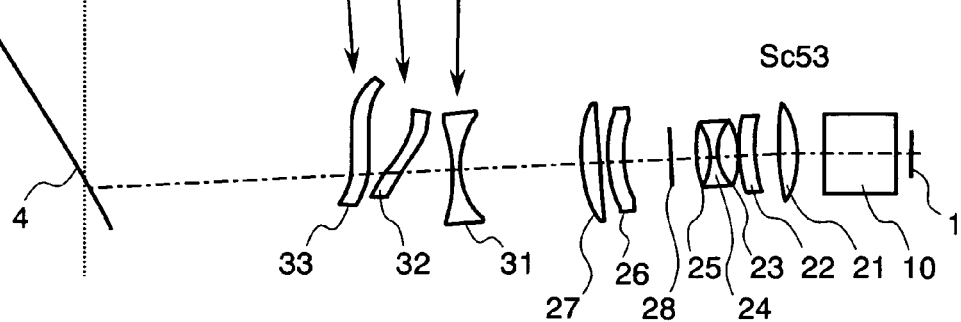

In FIGS. 6(*a*) to 6(*c*) is shown a manner of moving the lenses building up the rear lens group 3 to a predetermined position, i.e., the transmission lens 33 having the free curved surface, the other transmission lens 32 having the free curved surface, and the rotational symmetric lens 31 having the negative power, fitting to the position of the screen, on which the projection is made, i.e., the screen or image sizes, respectively. However, FIG. 6(*a*) shows the case of disposing the screen at the position 52 into the direction for reducing the projection image (for example, corresponding to the screen size of 60 inches), FIG. 6(*b*) the case of disposing the screen at the position 51 (for example, corresponding to the screen size of 80 inches), and FIG. 6(*c*) the case of disposing the screen at the position 52 into the direction for enlarging the projection image (for example, corresponding to the screen size of 100 inches), respectively. In FIGS. 6(*a*) to 6(*c*) are shown the lenses, each being emphasized in the movement thereof in a little bit, for the purpose of showing the manner of the movements of those lenses, clearly.

In this manner, moving and adjusting the lens group of the three (3) lenses, independently, into the direction of the optical axis, depending upon the distance up to the screen, i.e., the projection distance, enables to correct both, the focusing onto the screen and the picture distortion, between from the position 52 to the position 53 of the screen, and thereby enabling to obtain a preferable property or performance, like a focus adjusting operation achieved by the conventional rotational symmetric lens.

Figure 7:
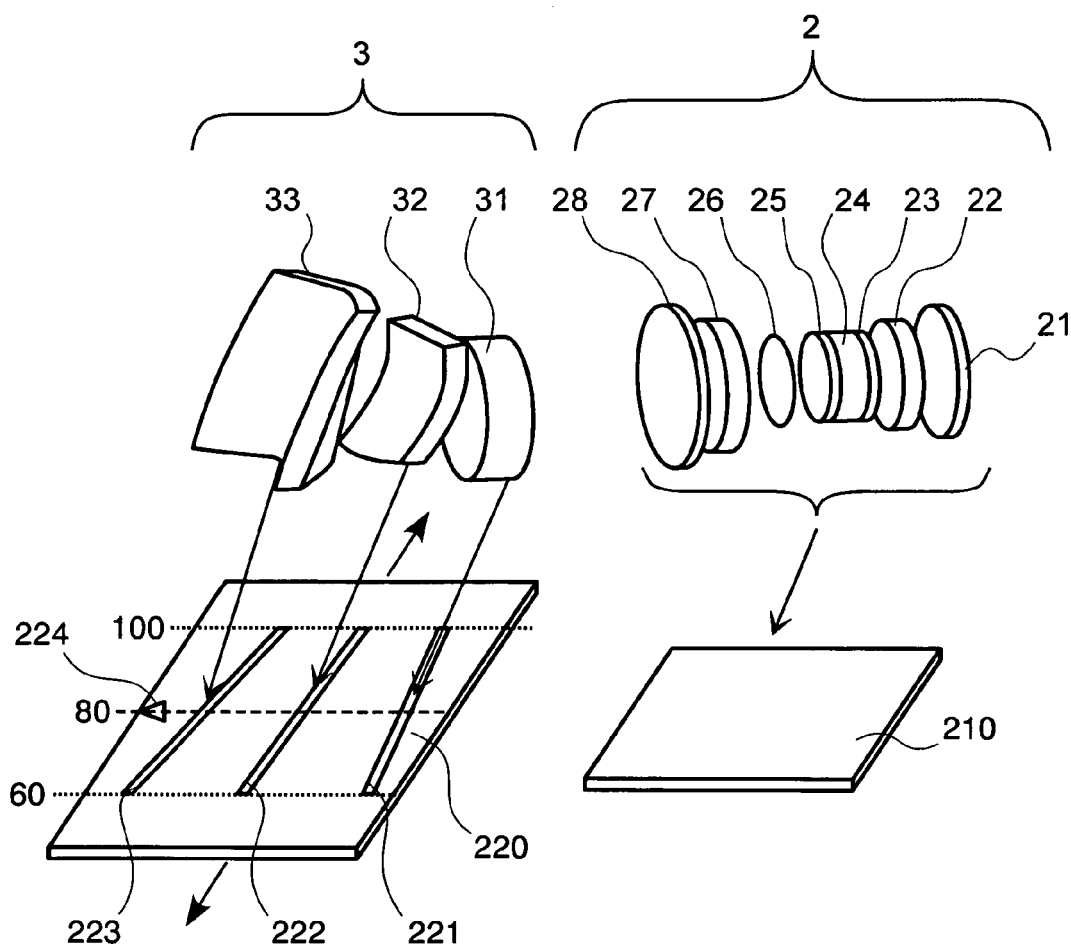
FIG. 7 is view for showing an example of structures for moving the rear lens group, within a projection type display apparatus.

Further, as the structures or mechanisms for moving the lens group, i.e., lenses 31 to 33, building up the rear lens group 3, for example, as is shown in FIG. 7, upon two (2) pieces of mounting plates 210 and 220 are mounted the front lens group 2 (the rotational symmetric lenses 21 to 27) and the rear lens group 3 (the rotational symmetric lenses 31 to 33), respectively. However, on one mounting plate (for example, the mounting plate 210) are fixed the front lens group 2 (the rotational symmetric lenses 21 to 27) at predetermined determined positions, and the mounting plate 210 is fixed within the apparatus. Then, on the other mounting plate (for example, the mounting plate 220), curved grooves 221, 222 and 223 are formed, in advance, thereon, so that the mounting plate 220 is provided to be movable to the mounting plate 210 (in this example, in the direction perpendicular to the direction of the optical axis of the lens group, as is shown in the figure).

However, the lenses 31 to 33 are divided into three (3) groups, i.e., the lens 31, the lens 32 and the lens 33, as is shown in FIGS. 6(*a*) to 6(*c*), and are moved in the positions thereof, respectively, corresponding to an obtainable size of the image by projecting it onto the screen (i.e., 60 inches, 80 inches, and 100 inches). Then, the grooves 221, 222 and 223 are formed corresponding to the movements of those three (3) groups of lenses, and as is shown in FIG. 7, the movable plate 220 is so constructed that the three (3) groups of lenses, the lens 31, the lens 32 and the lens 33 are disposed at the desired positions, respectively (i.e., at a desired inclination angle to each the lens group), corresponding to the positions of the marks 224 for indicating a reference formed thereon (for example, marks, such as, "60" inches, "80" inches and "100" inches, etc., on a base of the apparatus side, on which the mounting plate 220 is mounted). With this, it is possible to change the relative position of each lens of the rear lens group 3 (i.e., the lenses 31 to 33) to the front lens group 2, freely in the direction of the optical axis, only by moving the other mounting plate 220, i.e., enabling to obtain preferable performances or properties on both, the picture distortion and the focusing, for changes of projection distance between from the screen potion 52 to the position 53, with a simple or easy operation, like the focus adjustment by means of the conventional rotational symmetric lens.

Next, explanation will be made on an adjustment on the screen position on a front projector. With the front projector, it is important to enable a fine adjustment of the position on the screen, on which a picture is projected, in order to obtain a preferable usability or operability for a user, and a requirement is strongly made, in particular, on a fine adjustment of the position in the vertical direction. With the front projector having a long projection distance, like the convention alone, the fine adjustment can be made on the position of the picture by inclining the apparatus a little bit, and because the inclining angle is very little, then deterioration on the picture quality due to focus shift or the like is not so noticeable. However, within such the projection apparatus being very short in the projection distance as the embodiment 1, an angle of inclining the apparatus comes to be relatively large for shifting the picture position by the same amount achieved with the conventional apparatus. For that reason, a relatively large shift is generated, and also a trapezoidal distortion is produced, and therefore there is a problem that the picture quality is deteriorated.

Figure 8:
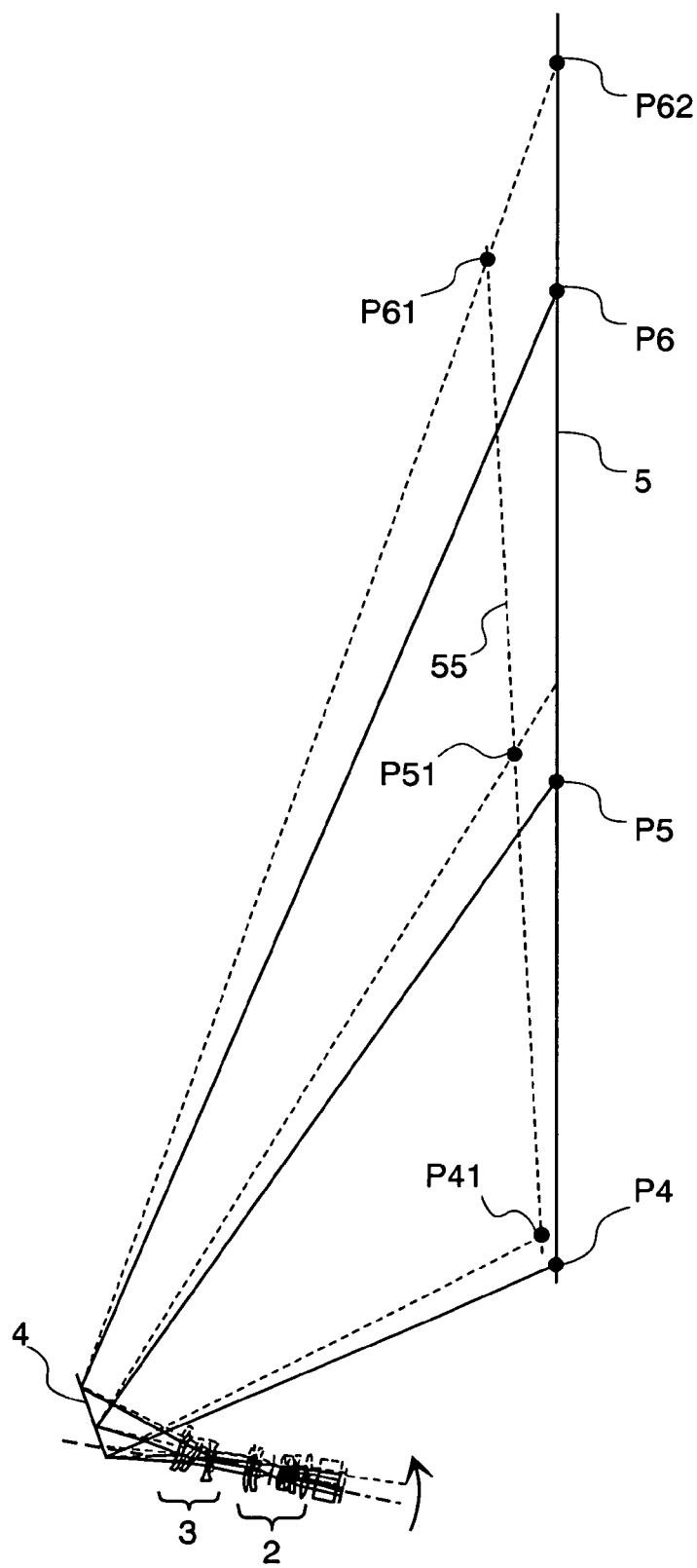
FIG. 8 is view for showing the case when shifting an image surface by inclining the optical unit, according to the embodiment 1.
Figure 9:
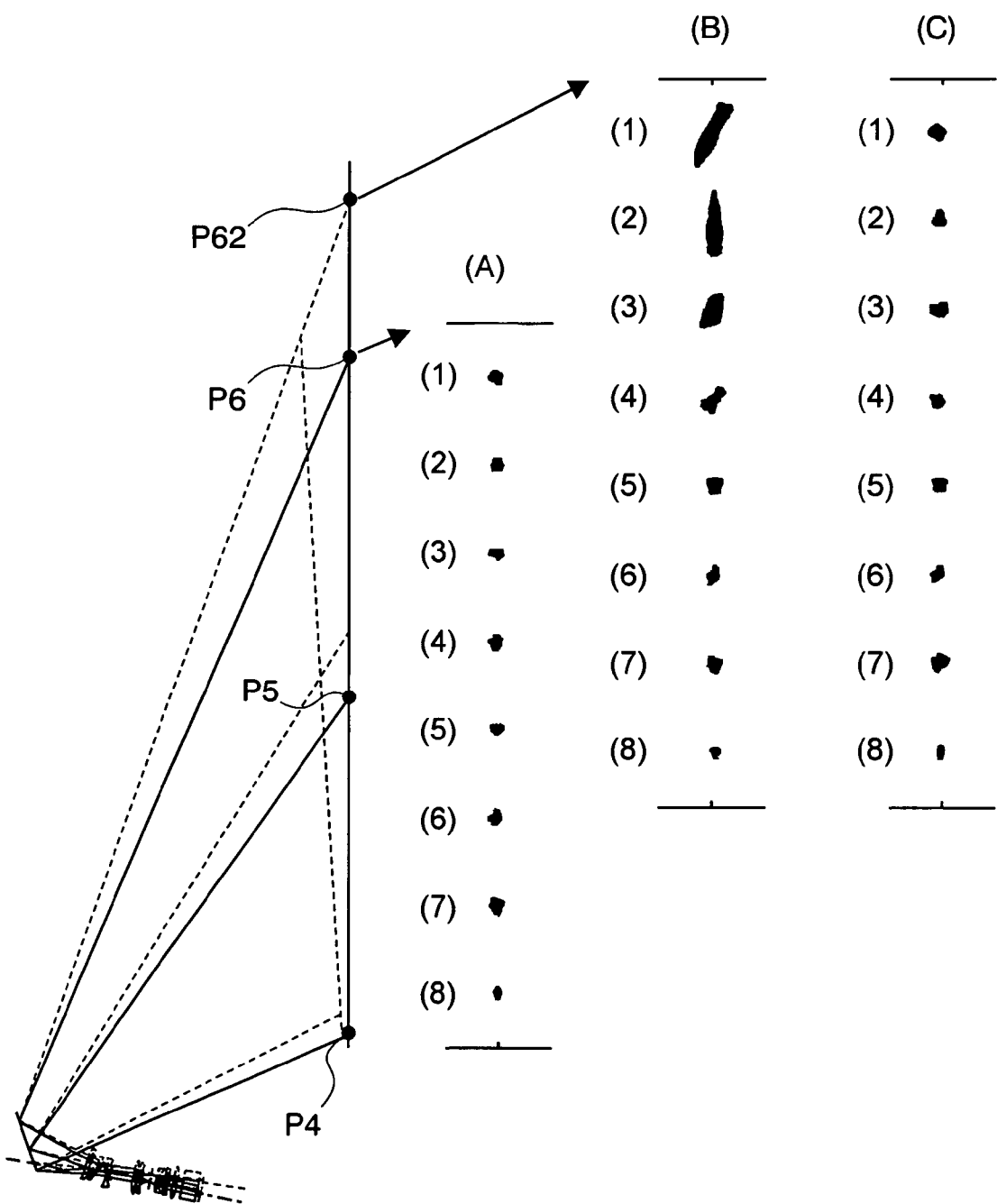
FIG. 9 is view for showing changes of the spots when shifting the image surface by inclining the optical unit, according to the embodiment 1.

FIG. 8 shows a manner of focus shifting, typically, in particular, when moving the picture on the screen upward by inclining the apparatus. In this FIG. 8, a broken line shows the condition when the apparatus upward is inclined upward, while a solid line shows the condition before that inclination. When inclining the apparatus upward, as is shown in FIG. 8, the entire image is moved upward, and also a surface, on which a preferable original focus of the optic system can be obtained, is moved to the position indicated by a broken line 51. Therefore, shifting of the focus is generated upon a picture plane on the screen 5. For example, on the upper end of the picture plane, with inclination of the apparatus, a point P6 at the upper end of the picture plane before inclining moves to a point P61 on the screen 5, i.e., moves upward, but a point where the optic system is in focus moves to a point P62 on the focus surface 51 of the optic system; therefore, a focus shift is generated by a distance from the point P62 to the point P61, and thereby enlarging the spot size. On the other hand, on a lower end of the picture plane, although a focus point P4 before inclination moves to a point P41 by the inclination thereof, but the difference thereof is small comparing to that on the upper end of the picture plane. In this manner, as is shown in FIG. 8, shifting of the focus is large on the upper side, and is small on the lower side. Thus, an amount of focus shifting differs depending upon the position on the picture plane, and therefore, an amount also differs on the deterioration of the spot configuration. An example is shown in FIG. 9, where the spot configuration is changed at a plural number of points on the picture plane, before and after inclination of the apparatus. In this FIG. 9, the configuration of the spot at the same point to that on the picture plane shown in FIG. 5 is shown by the configurations of the spot before and after an inclination of a set. Thus, the spot before inclining the set is shown by (A) in FIG. 9, and that after inclining by (B) in FIG. 9. Positions of the points where estimation is made on the spot are as were mentioned above, and according to those, (1) to (3) are the points lying on the upper side of the picture plane, (4) the point at the center of the picture plane, and (5) to (8) the points on the lower side of the picture plane, respectively. As shown by the spot configurations in FIG. 9, an increase of the spot is large at the point lying on the upper side of the picture plane, and it can be seen that the spot size is enlarged to be equal or greater than 5 times, comparing to that before inclination, on the upper end of the picture plane.

In case when moving the picture on the screen by inclining the apparatus, because the shift amount of the focus differs from, depending upon the position on the picture plane, for fitting the focus on the screen, it is difficult to achieve an adjustment by tuning of the panel position or movement of the rotational symmetric lens.

Then, as a result of research made upon the lenses, which are effective for an improvement of the focus shifting mentioned above, while moving the lenses, it is found out that it is effective to move two (2) pieces of lenses, in particular, the transmission lens 32 and the transmission lens 33, both having the free curved surface and building up the rear lens group, independently, by only a predetermined distance, respectively, into the direction of the optical axis thereof. Examples of the spot configurations are shown in (C) of FIG. 9, as the result of spot adjustment by moving the transmission lens 32 and the transmission lens 33, under the condition where the spot size comes to be large by inclining the apparatus. As is shown in (C) of FIG. 9, with moving and adjusting the transmission lens 32 and the transmission lens 33, having the free curved surfaces, into the direction of the optical axis thereof, it is possible to correct the spot configuration, preferably. However, it is also effective to move the mirror 4 having the free curved surface. However, since there are many difficulties to move the mirror 4, which is disposed to be inclined and also has the free curved surface being relatively large in the size, from a viewpoint of the structures of that apparatus, therefore it is the most effective to move the transmission lens 32 and the transmission lens 33, in particular.

As was mentioned above, the shift in focusing can be corrected, preferably, by the movement of the lenses, when moving the picture plane by inclining the apparatus, but the trapezoidal distortion cannot be corrected. However, the trapezoidal distortion generated herein is almost trapezoidal in the shape and largeness thereof is about 10%, and therefore, it is possible to deal with this, through a picture distortion correcting process by means of circuitry.

As was mentioned in the above, it is found that the movement of the transmission lens 32 and the transmission lens 33 into the direction of the optical axis thereof is effective for achieving the focus adjustment corresponding to the movement of the picture plane. On the other hand, the transmission lens 32 and the transmission lens 33 are also used for the adjustment, in case when changing the projection distance, mentioned previously. For brining two (2) pieces of lenses to cope with the two (2) adjustments mentioned above, as the apparatuses or devices for driving the transmission lens 32 and the transmission lens 33, two (2) kinds of driving apparatuses or devices are needed, i.e., for achieving an adjustment for the movement of the picture plane, and also for achieving an adjustment for change of the projection distance, therefore, they must be very complex in the driving structures thereof, and cannot be achieved easily.

Then, as a result of studying in details thereof, i.e., the positional relationship in the movements of the transmission lens 32 and the transmission lens 33 in case when corresponding to the change of the screen position, and the positional relationship in the movements of the transmission lens 32 and the transmission lens 33 in case when corresponding to the adjustment of the position of the screen, it is found that the positional relationships of the transmission lens 32 and the transmission lens 33 are almost same to each other in both cases.

Figure 10:
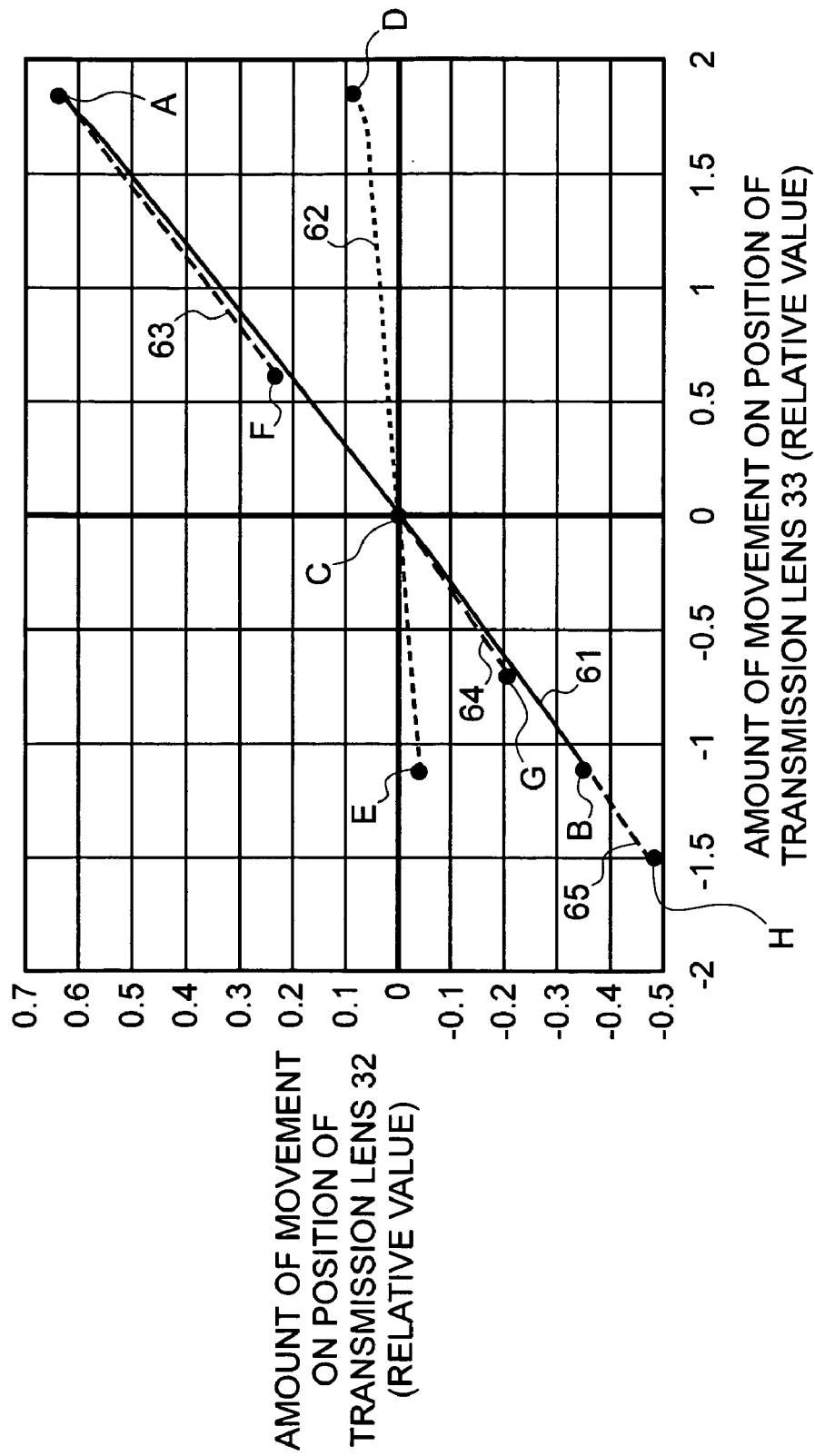
FIG. 10 is a view for showing a relationship of lenses to be moved for adjusting movement of the screen.

With this, further details thereof will be explained. FIG. 10 shows a relationship between the position of the transmission lens 32 and the position of the transmission lens 33. In this FIG. 10, the horizontal axis thereof shows the position of the transmission lens 32 and the vertical axis thereof the position of the transmission lens 33. In this instance, the positions of both lenses are indicated by values of Z-axis, wherein assuming an apex of the surface of the lens not moving (for example, the lens 28 of the lens group 2) to be the origin, i.e., while assuming that the optical axis of the lens group is the Z-axis and the direction from a side, on which the panel is located, toward the free curved surface mirror 4, is positive, but not by the distance between the lenses with each other, such as, the distance between the surfaces thereof, for example. Also, both the vertical axis and the horizontal axis are indicated by absolute values upon criteria of the positions of the both transmission lenses, within the screen size (for example, corresponding to the screen size of 80 inches), being a center of design.

In FIG. 10, a solid line 61 shows the relationship of the position of the transmission lens 32 to the position of the transmission lens 33 from a point "A" to a point "B", in particular when the lenses move corresponding to changing of projection distance. The point "A" is that in the case where the projection distance is near (for example, corresponding to the screen size of 60 inches), the point "B" the position in the case where the projection distance is far (for example, corresponding to the screen size of 100 inches), and the point "C" the position when the projection distance is at the center of design (for example, corresponding to the screen size of 80 inches). The solid line 61 shows that, when the projection distance comes close to the center of design and the screen size is small, both the transmission lens 33, as well as, the transmission lens 32, moves into the positive direction, i.e., into the direction of the free curved surface mirror 4, and moves up to the position indicated by the point "A", the nearest in the projection distance upon design, and also that, when the projection distance comes to furthest from on design, the transmission lens 33, as well as, the transmission lens 32 moves into the negative direction, and move up to the position indicated by the point "B". In this instance, the transmission lens 31, i.e., a concave lens moves, as is shown by a dotted line 62 in FIG. 10, from a point "E" when the projection distance is furthest, directing to a point "D" when the projection distance is nearest.

On the other hand, in case of adjustment onto the movement of the screen position, they move as shown by broken lines in FIG. 10. For example, under the condition that the projection distance is short (corresponding to the screen size 60 inches), the transmission lenses 33 and 32 are at the position of the point "A", but in case when moving the picture or image on the screen upward by inclining the apparatus, then corresponding to this, the transmission lens 33 and the transmission lens 32 are moved from the point "A" toward a point "F" along the broken line 63 shown in the figure. It is found that, with this, the focus can be released from unbalancing, and thereby enabling to maintain a preferable picture quality. When the upper end of the picture plate moves upward by about 20% of the height of the screen, it is preferable to move the positions of the transmission lenses up to the position indicated by the point "F".

Herein, it can be seen that the point "F" is in the most vicinity of the solid line 61 directing from the point "A" to the point "B", in other words, a broken line 63 lies on a line almost same to the solid line 61 directing from the point "A" to the point "B". This means, the positional relationship of the transmission lens 33 and the transmission lens 32 moves under the almost same relationship thereof, even in case when they are adjusted corresponding to the change of the projection distance, and also in case when they are adjusted corresponding to the movement of the screen. Thus, it means that when the position of the transmission lens 33 is determined, then the position can be determined, uniquely or uniformly, at the same time, even in either one of the adjustments.

Next, in case where the projection distance is at the center of design (for example, corresponding to the screen size of 80 inches), the positions of the transmission lenses 33 and 32 are at the point "C" when the inclination of the apparatus is zero (0), and when the picture or image is moved upward by inclining the apparatus, it is preferable to move the transmission lenses 33 and 32 following a broken line 64, so that they are moved up to a point "G" when the picture moves upward by about 20% of the height of the screen. It can be also seen that, the broken line 64 directing from the point "C" to the point "G" lies almost on the solid line directing from the point "A" to the point "B".

Also, for example, in case where the projection distance is far (for example, corresponding to the screen size of 100 inches), the transmission lenses 33 and 32 lying on the relationship of the point "B", when there is no inclination of the apparatus, move into the direction of a point "H" along a broken line 65 as the picture plate moves upward, and it is preferable, so as to locate at the point "H" when moving by about 20% of the height of the screen. It is also apparent that this broken line 65 lies on an extension line of the solid line 61.

Further, also when the projection distance is in the middle of the values mentioned above, although not described herein, but the directions of movements of the transmission lens 33 and the transmission lens 32 for adjustment to the movement of the screen are also approximately on the solid line 61, in the similar manner to the above.

As was mentioned above, it is found that the broken line indicative of the movements of the transmission lens 33 and the transmission lens 32, corresponding to the movement of the screen by inclination of the apparatus, are almost on the same line to the solid line 61 indicative of the movements of the transmission lens 33 and the transmission lens 32, corresponding to changing of the screen size due to change of the projection distance, irrespective of any projection distance. Thus, it is indicated that the positional relationship between the transmission lens 33 and the transmission lens 32 moves under the almost same positional relationship, when corresponding to the change of the projection distance, and also when corresponding to the movement of the screen.

Figure 11:
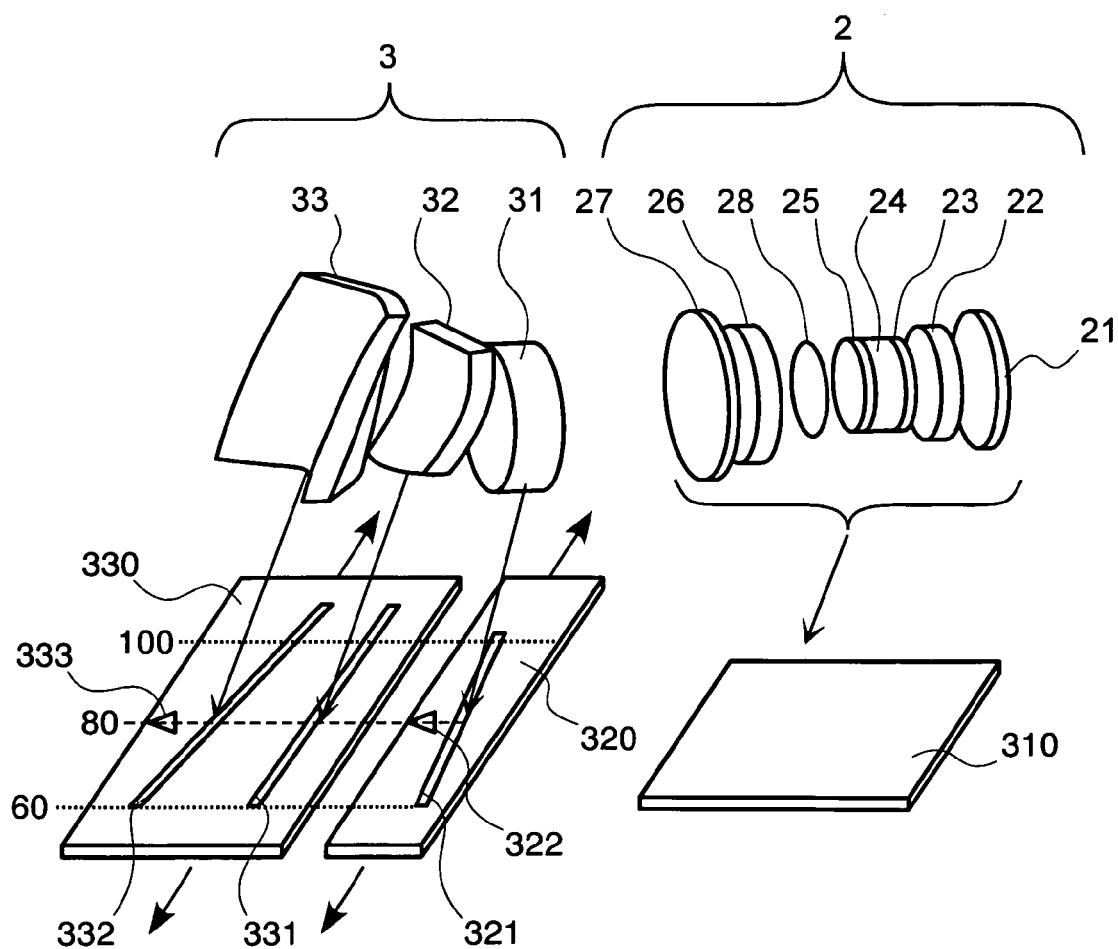
FIG. 11 a view for showing an example of the structures for achieving movement of the rear lens group for dealing with the change of the projection distance and the movement of the image surface, within the optical unit, according to the embodiment 1.

Then, as the structures for moving the transmission lenses 31 to 33, corresponding to both, i.e., the change of the projection distance and the movement of the screen, for example, as is shown in FIG. 11, the front lens group 2 (i.e., the rotational symmetric lenses 21 to 28) and the rear lens group 3 (i.e., the lenses 31 to 33) are mounted on three (3) pieces of mounting tables 310, 320 and 330, respectively. On the first mounting table (for example, the mounting table 310) is fixed the front lens group 2 at a predetermined position, and this mounting table 210 is fixed within the apparatus. Then, on the next mounting table (for example, the mounting table 320) are formed grooves 321, in advance, and also this mounting table 320 is provided within the apparatus, to be moveable with respect to the mounting table 310 (in this example, into the direction perpendicular to the optical axis of the lens group as is shown by an arrow in the figure). Further, on a third mounting table (for example, the mounting table 330) are also formed grooves 331 and 332, in advance, and also the mounting table 330 is provided within the apparatus, to be movable with respect to the mounting table 310 and the mounting table 320 (in this example, into the direction perpendicular to the optical axis of the lens group as is shown by an arrow in the figure).

However, the lenses 31 to 33 building up the rear lens group 3 are divided into three (3) groups by each one (1) piece thereof, respectively, and the positions of the respective groups move corresponding to the change of the projection distance up to the screen. Then, the grooves 321, 331 and 332 are formed corresponding to the movements of those three (3) groups of lenses, and on the mounting tables 320 and 330 are formed marks 322 and 323 indicative of a reference, at the position where the three (3) groups of lenses should be disposed, for example, the center of design. In case when the projection distance is changed, it is possible to change the relative position of three (3) sets of the lens groups building up the rear lens group 3 to the front lens group 2, freely, in the direction of the optical axis, by moving two (2) sets of the mounting tables, i.e., the mounting tables 320 and 330, at the same time, under the condition that the position of each of the marks is coincident with.

Furthermore, the group of lens 32 and the group of lens 33 move corresponding to the vertical movement of the screen. In this instance, since the positional relationship, under which the lens 32 and the lens 33 should move responding to the movement of the screen, is same to the positional relationship of the movement corresponding to the change of the projection distance, as was mentioned above, therefore it is possible to change the lenses 32 and 33, i.e., relative positions thereof, freely, to the adjustment position corresponding to the movement of the screen with respect to the front lens group 2, by moving only the mounting table 330, into the direction shown by an arrow in FIG. 11, for example.

As was mentioned in the above, according to the embodiment 1, it is possible to achieve a simple or easy method for enabling an adjustment of the focus corresponding to both, i.e., the change on the size of the picture due to change of the projection distance, and the vertical movement of the picture due to inclination of the apparatus.

In case when trying to change the image plane size by changing the projection distance, after moving the image by inclining the apparatus, it is possible to adjustment by, firstly moving the mounting base 320 and the mounting base 330, at the same time, and by the same amount (i.e., not changing the positional relationship of the marks 322 and 333, formed on each), and thereafter moving the mounting base 320 and the mounting base 330, finely and independently.

Herein, among the lens groups to be moved corresponding to the change of the screen size due to change of the projection distance, the transmission lens group 31 having the negative power may be a lens group, which is made up with a plural number of rotational symmetric lenses, but preferably, the lenses building up the lens group 31 do not include the aspheric surface lens or the free curved surface lens therein. Because, the aspheric surface lens included in the lens group 31 to be moved, being high in degree of freedom, can correct also the distortions of details of relatively high dimensions within the movement for adjustment corresponding to change of the projection distance, and then the positional relationship within movements of the transmission lens 32 and the transmission lens 33, which are moved with this at the same time, comes to be large in the difference from the relationship in the case of movement for adjustment corresponding to the movement of the image, not including the movement of the lens group 31 therein, and the structures for driving the lenses come to be complex.

Also, as the structures for driving lenses, in the place of the mounting tables mentioned above, it is also possible to achieve the function similar to that mentioned above, by using a cylinder, being formed with such the groves as was mentioned above, on an outer periphery thereof, for example. However, in that case, in particular, the two (2) pieces of transmission lenses 32 and 33, each having the free curved surface within the rear lens group 3, are not necessary to accompany the rotation thereof, irrespective of change of the relation position in the direction of the optical axis thereof. For this reason, it is preferable to have such the structures, for example, i.e., the cylinder-like member is divided into a front side and a rear side, to be rotatable to each other, independently, but the front side cannot rotate around.

Embodiment 2

In an embodiment 2, explanation will be made on the embodiment of numerical values, in more details thereof.

Figure 12:
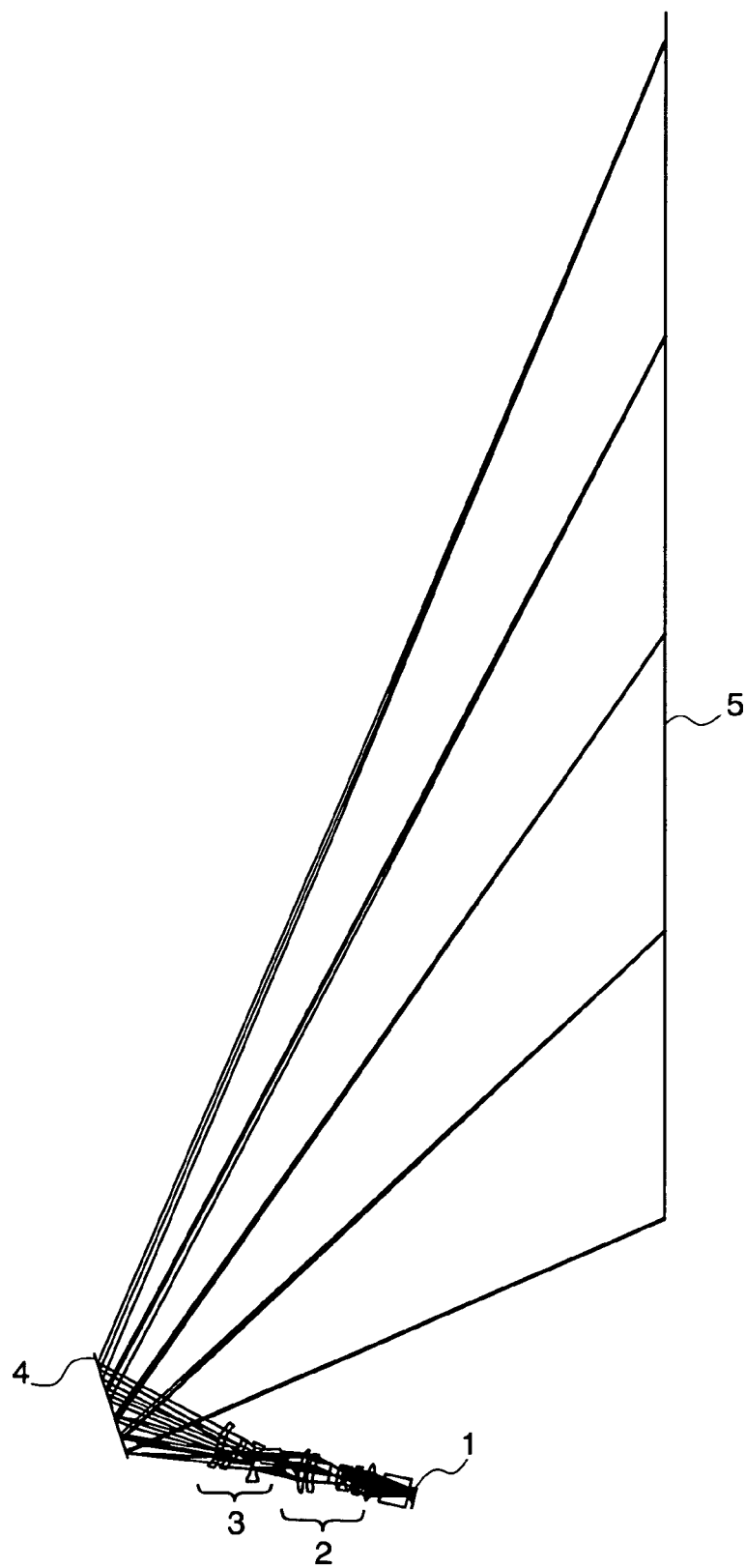
FIG. 12 is a view for showing the Y-Z cress-section for showing the structures and optical paths, according to an embodiment 2.
Figure 13:
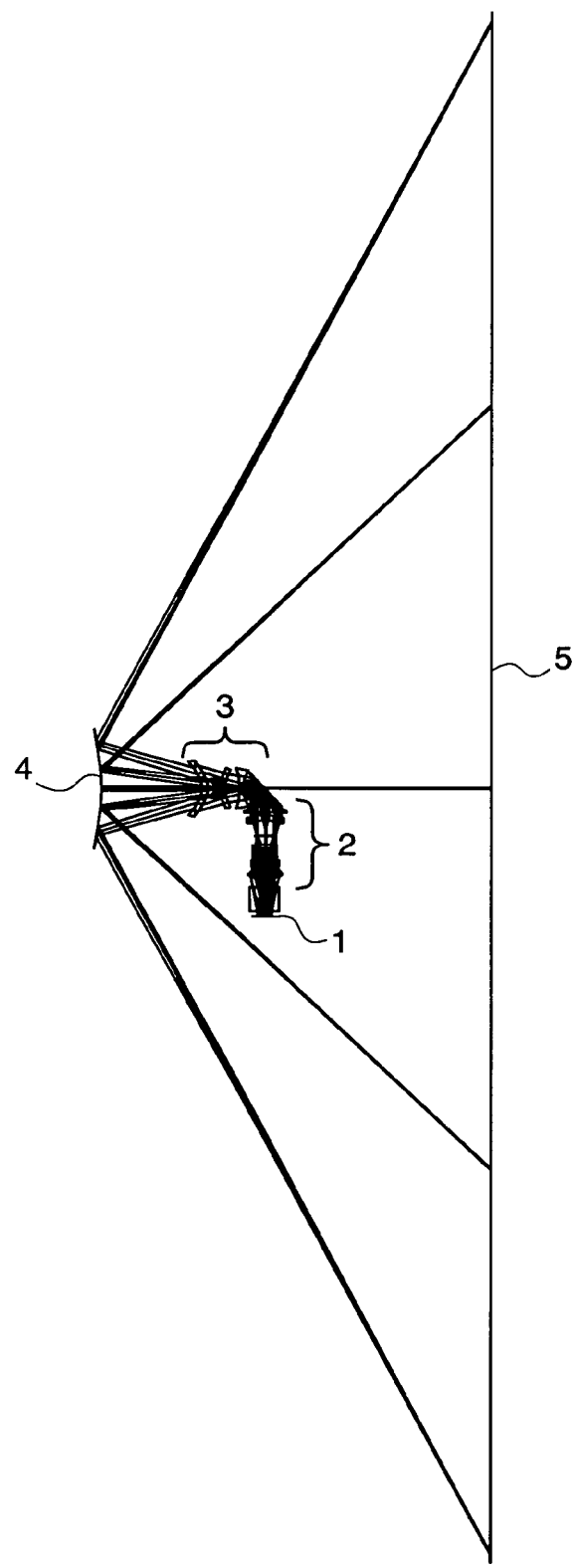
FIG. 13 is a view for showing the X-Z cress-section for showing the structures and optical paths, according to the embodiment 2.
Figure 14:
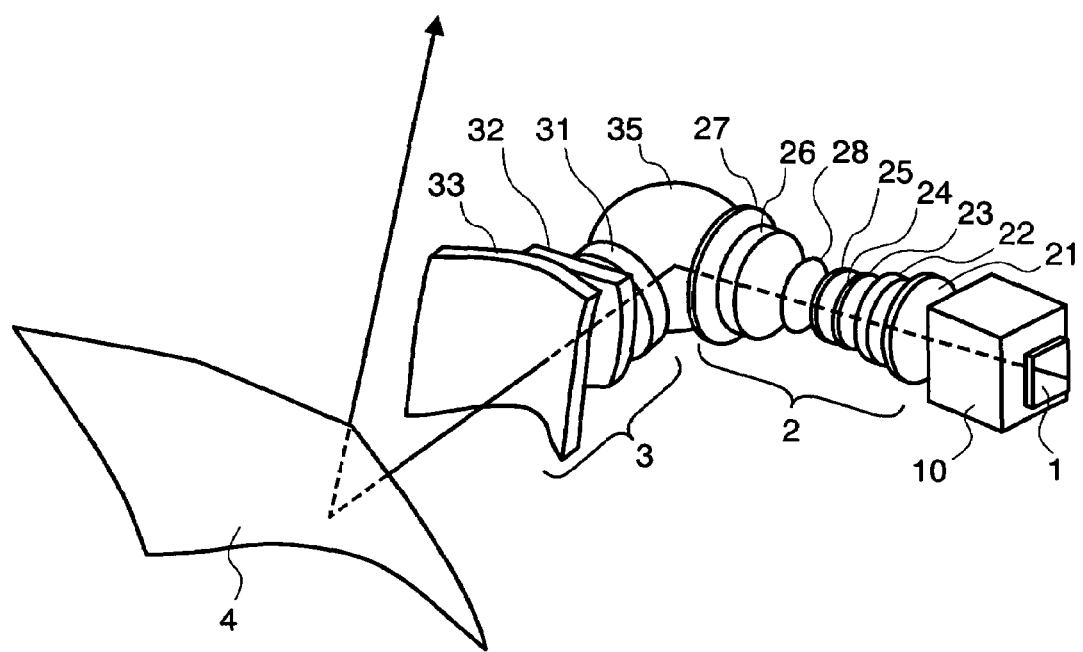
FIG. 14 is a perspective view for showing the lens arrangement of the optical unit, according to an embodiment 2.

Firstly, explanation will be made on the details of the optic unit, according to the embodiment 2, by referring to FIGS. 12 and 13 and tables 1 to 4, while showing the detailed numerical values of the optical elements, including the lens optic system and the reflection optic system therein. However, FIGS. 12 and 13 are diagrams for showing light beams in the optic system according to the present invention, upon basis of an example of first numerical values. Thus, within XYZ rectangular coordinates system shown in FIG. 1 mentioned above, FIG. 12 shows the Y-Z cross-section, i.e., extending the optic system into the Z-axis direction. Also, FIG. 13 shows the structures on X-Z cross-section. Further, this FIG. 13 shows an example of disposing the bending mirror 35 on the way between the front lens group 2 and the rear lens group 3 building up the lens optic system, as is shown in the details thereof in FIG. 14, and thereby bending the light path into the X-axis direction, once.

In the present embodiment, the light emitted from the image display element 1, which is below in FIG. 12, firstly passes through the front lens group 2 built up with only lenses, each having only surfaces that are rotationally symmetric, among the lens optic system including the plural number of lenses therein. Then, it passes through the rear lens group 3 including the free curved surface lens that is rotationally asymmetric, and is reflected upon the reflection surface of the free curved surface mirror 4 within the reflection optic system. Thereafter, the reflecting light thereupon is incident upon the screen 5.

Herein, the front lens group 2 of the lens optic system is built up with the plural number of lenses, all of which have a refracting surface of rotationally symmetric configuration, and four (4) of the refracting surfaces of those lenses have aspheric surfaces, each being rotationally symmetric, and others have the spherical surfaces. The aspheric surface being rotationally symmetric, which is used therein, can be expressed by the following equation (Eq. 2), with using a local cylindrical coordinates system for each surface:

$$Z = \frac{cr^2}{1+\sqrt{1-(1+k)c^2r^2}} + A \cdot r^4 + B \cdot r^6 + C \cdot r^8 + D \cdot r^{10} + E \cdot r^{12} + F \cdot r^{14} + G \cdot r^{16} + H \cdot r^{18} + J \cdot r^{20}$$

Where, "r" is the distance from an optic axis, and "Z" represents an amount of sag. Also, "c" is the curvature at an apex, "k" a conical constant, "A" to "J" coefficients of a term of power of "r".

On the other hand, the free curved surfaces building up the rear lens group 3 of the lens optic system mentioned above can be expressed by the following equation (Eq. 3), including polynomials of X and Y, with applying the local coordinates system (x, y, z) assuming the apex on each surface to be the origin.

$$Z = \frac{cr^2}{1+\sqrt{1-(1+k)c^2r^2}} + \sum_m \cdot \sum_n (C(m,n) \cdot x^m \cdot y^n)$$

Where, "Z" represents an amount of sag of the free curved surface configuration, in particular, into the direction perpendicular to X- and Y-axes, "c" the curvature at the apex, "r" the distance from the origin within a plane of X- and Y-axes, "k" the conical constant, and C(m, n) the coefficients of the polynomials.

The following table 1 shows the numerical data of the optic system, according to the present embodiment. In this table 1, S0 to S22 correspond to the marks S0 to S22 shown in FIG. 3 mentioned above, respectively. Herein, the mark S0 shows the display surface of the image display element 1, i.e., the object surface, and S22 the reflection surface of the free curved surface mirror 4. Also, a mark S24 shows an incident surface of the screen 5, shown also in FIGS. 12 and 13, i.e., the image surface for clearly showing the inclination of the optical axis, later.

TABLE 1

| Surface | Rd | TH | nd | vd |
|---|---|---|---|---|
| S0 | Infinity | 5.977 | | |
| S1 | Infinity | 26.395 | 1.51680 | 64.2 |
| S2 | Infinity | 9.938 | | |
| S3 | 36.40 | 6.700 | 1.84666 | 23.8 |
| S4 | −172.286 | 8.870 | | |
| S5* | 4710.437 | 6.000 | 1.49091 | 58.0 |
| S6* | −1284.473 | 0.100 | | |
| S7 | 35.918 | 8.000 | 1.48749 | 70.4 |
| S8 | −19.759 | 2.500 | 1.84666 | 23.8 |
| S9 | 20.619 | 5.800 | 1.48749 | 70.4 |
| S10 | −48.583 | 9.000 | | |
| S11 | Infinity | 17.160 | | |
| S12* | −38.217 | 6.000 | 1.49091 | 58.0 |
| S13* | −40.281 | 2.360 | | |
| S14 | 1001.620 | 7.200 | 1.80610 | 33.3 |
| S15 | −42.940 | 44.228 | | |
| S16 | −29.908 | 3.500 | 1.48749 | 70.4 |
| S17 | 72.760 | 19.858 | | |
| S18# | Infinity | 6.000 | 1.49091 | 58.0 |
| S19# | Infinity | 6.932 | | |
| S20# | Infinity | 6.000 | 1.49091 | 58.0 |
| S21# | Infinity | 102.031 | | |
| S22# | Infinity | 0.0 | REFL | |
| S23# | Infinity | −888.477 | | |
| S24# | Infinity | | | |

Also, in the table 1 mentioned above, "Rd" is the radius of curvature for each surface, and it is presented by a positive value in case when having a center of curvature on the left-hand side of the surface in FIG. 3 mentioned above, while by a negative value in case when having it on the right-hand side, contrary to the above. "TH" is the distance between the surfaces, i.e., presenting the distance from the apex of the lens surface to the apex of the next lens surface. The distance between the surfaces is presented by a positive value in case when the next lens surface is at the left-hand side, while by a negative value in case when it is at the right-hand side, with respect to that lens surface.

Further, in the table 1 mentioned above, S5, S6, S17 and S18 are aspheric surfaces, being rotationally symmetric, and also in this table 1, they are attached with "*" beside the surface numbers for easy understanding thereof, wherein coefficients of the aspheric surface of those four (4) surfaces are shown in the table 2 below.

TABLE 2

| Surface | | | Aspheric Surface Coefficients | | | | | |
|---|---|---|---|---|---|---|---|---|
| S5 | K | 76267.9963 | C | −4.351E−11 | F | 6.488E−18 | J | −6.107E−26 |
| | A | −3.65E−05 | D | 4.0368E−13 | G | 1.05201E−21 | | |
| | B | 5.477E−09 | E | 1.5886E−18 | H | −4.589E−24 | | |

TABLE 2-continued

| Surface | | | Aspheric Surface Coefficients | | | | | |
|---|---|---|---|---|---|---|---|---|
| S6 | K | −78271.536 | C | −1.557E−11 | F | 4.9662E−18 | J | 3.4853E−25 |
| | A | −3.781E−05 | D | −2.675E−13 | G | −1.676E−20 | | |
| | B | −9.286E−09 | E | −2.14E−17 | H | −9.422E−23 | | |
| S12 | K | 0.35333475 | C | 4.6989E−11 | F | 1.2748E−18 | J | 5.3155E−26 |
| | A | −6.576E−07 | D | −7.849E−14 | G | −4.983E−21 | | |
| | B | 2.5656E−08 | E | 2.3211E−16 | H | −1.8574E−23 | | |
| S13 | K | 0.05198949 | C | 1.2912E−11 | F | 1.7517E−19 | J | 7.3476E−27 |
| | A | 1.9971E−06 | D | 1.4302E−14 | G | −1.034E−22 | | |
| | B | 1.6908E−08 | E | −9.82E−19 | H | −4.354E−24 | | |

Also, S18 to S21 in the table 1 mentioned above are the refracting surfaces, each having the free curved surface configuration, which builds up the rear lens group of the lens optic system, and S22 is the reflection surface 4 having the free curved surface configuration S23 of the reflection optic system, wherein they are shown by attaching "#" beside the surface numbers thereof. Values of the coefficients for presenting the configurations of those five (5) free curved surfaces are shown in the table 3 below. Also, the values of coefficients of the free curved surfaces shown in the Table 3 are the values when assuming the direction from the right to the left is the positive direction on the Z-axis, while the direction from the upper to the lower is the positive direction on the Y-axis.

TABLE 3

| Surface | | | | | Free Curved Surface Coefficients | | | | |
|---|---|---|---|---|---|---|---|---|---|
| S18 | K | 0 | C(4, 1) | 2.74E−06 | C(2, 5) | −9.44E−09 | C(4, 5) | 1.74E−11 |
| | C(0, 1) | 0.77728116 | C(2, 3) | 3.86E−06 | C(0, 7) | −7.23E−10 | C(2, 7) | 4.61E−12 |
| | C(2, 0) | −0.0237261 | C(0, 5) | 3.28E−06 | C(8, 0) | 2.78E−10 | C(0, 9) | −9.63E−13 |
| | C(0, 2) | −0.011193 | C(6, 0) | 6.21E−08 | C(6, 2) | 7.46E−11 | C(10, 0) | −2.93E−13 |
| | C(2, 1) | −0.0009319 | C(4, 2) | 5.72E−08 | C(4, 4) | 2.14E−10 | C(8, 2) | −3.53E−13 |
| | C(0, 3) | −0.0013365 | C(2, 4) | −9.29E−08 | C(2, 6) | −8.31E−11 | C(6, 4) | −9.12E−14 |
| | C(4, 0) | 8.592E−06 | C(0, 6) | 2.16E−08 | C(0, 8) | 5.95E−11 | C(4, 6) | 3.04E−13 |
| | C(2, 2) | 7.2254E−05 | C(6, 1) | −6.35E−09 | C(8, 1) | 4.34E−12 | C(2, 8) | 6.40E−14 |
| | C(0, 4) | 3.3648E−05 | C(4, 3) | −3.10E−09 | C(6, 3) | 7.31E−12 | C(0, 10) | −1.11E−13 |
| S19 | K | 0 | C(4, 1) | 9.64E−07 | C(2, 5) | 1.90E−09 | C(4, 5) | 9.12E−12 |
| | C(0, 1) | 0.78854159 | C(2, 3) | 2.85E−07 | C(0, 7) | 7.20E−10 | C(2, 7) | 1.82E−12 |
| | C(2, 0) | −0.0216438 | C(0, 5) | 1.75E−06 | C(8, 0) | 1.45E−10 | C(0, 9) | −2.48E−12 |
| | C(0, 2) | −0.012203 | C(6, 0) | −4.13E−08 | C(6, 2) | 2.25E−10 | C(10, 0) | −1.25E−13 |
| | C(2, 1) | −0.0005154 | C(4, 2) | −2.39E−08 | C(4, 4) | 4.12E−10 | C(8, 2) | −3.19E−13 |
| | C(0, 3) | −0.0010429 | C(2, 4) | −1.68E−07 | C(2, 6) | 3.16E−10 | C(6, 4) | −1.41E−13 |
| | C(4, 0) | 3.7301E−06 | C(0, 6) | −3.52E−08 | C(0, 8) | 7.10E−11 | C(4, 6) | 4.54E−14 |
| | C(2, 2) | 7.7564E−05 | C(6, 1) | −1.88E−09 | C(8, 1) | 3.04E−13 | C(2, 8) | −1.09E−13 |
| | C(0, 4) | 4.9708E−05 | C(4, 3) | 3.47E−09 | C(6, 3) | 3.70E−12 | C(0, 10) | −1.04E−13 |
| S20 | K | 0 | C(4, 1) | −9.35E−07 | C(2, 5) | 2.47E−09 | C(4, 5) | −1.19E−12 |
| | C(0, 1) | 0.22293143 | C(2, 3) | −1.67E−06 | C(0, 7) | −3.56E−10 | C(2, 7) | −7.502E−13 |
| | C(2, 0) | 0.03205384 | C(0, 5) | −1.29E−06 | C(8, 0) | 2.45E−12 | C(0, 9) | 8.53E−13 |
| | C(0, 2) | 0.01991488 | C(6, 0) | 4.12E−09 | C(6, 2) | 1.76E−12 | C(10, 0) | −1.95E−15 |
| | C(2, 1) | 0.00104417 | C(4, 2) | −6.91E−09 | C(4, 4) | −5.48E−12 | C(8, 2) | −4.34E−15 |
| | C(0, 3) | 0.0004342 | C(2, 4) | 9.00E−09 | C(2, 6) | 4.84E−11 | C(6, 4) | −1.07E−14 |
| | C(4, 0) | −1.696E−05 | C(0, 6) | −2.31E−08 | C(0, 8) | 5.54E−12 | C(4, 6) | −1.34E−14 |
| | C(2, 2) | −6.336E−05 | C(6, 1) | 1.63E−10 | C(8, 1) | −1.56E−14 | C(2, 8) | −2.46E−14 |
| | C(0, 4) | −2.687E−05 | C(4, 3) | 6.15E−10 | C(6, 3) | −6.25E−14 | C(0, 10) | 1.47E−14 |
| S21 | K | 0 | C(4, 1) | −1.36E−06 | C(2, 5) | 2.59E−09 | C(4, 5) | −9.87E−13 |
| | C(0, 1) | 0.21505056 | C(2, 3) | −2.06E−06 | C(0, 7) | 1.96E−10 | C(2, 7) | −6.75E−13 |
| | C(2, 0) | 0.03681255 | C(0, 5) | −1.28E−06 | C(8, 0) | 2.06E−12 | C(0, 9) | 4.03E−13 |
| | C(0, 2) | 0.02059904 | C(6, 0) | 7.16E−09 | C(6, 2) | 4.46E−12 | C(10, 0) | −2.22E−15 |
| | C(2, 1) | 0.00115712 | C(4, 2) | −4.08E−09 | C(4, 4) | 1.52E−11 | C(8, 2) | −3.08E−15 |
| | C(0, 3) | 0.00031471 | C(2, 4) | 8.85E−09 | C(2, 6) | 4.61E−11 | C(6, 4) | −1.23E−14 |
| | C(4, 0) | −2.255E−05 | C(0, 6) | −1.31E−08 | C(0, 8) | 1.13E−11 | C(4, 6) | −1.38E−14 |
| | C(2, 2) | −2.824E−05 | C(6, 1) | 5.16E−10 | C(8, 1) | −1.23E−13 | C(2, 8) | −2.08E−14 |
| | C(0, 4) | −3.402E−05 | C(4, 3) | 1.32E−09 | C(6, 3) | −1.52E−13 | C(0, 10) | 4.81E−15 |
| S22 | K | 0 | C(4, 1) | −9.57E−09 | C(2, 5) | −9.95E−13 | C(4, 5) | −3.43E−17 |
| | C(0, 1) | −0.9417768 | C(2, 3) | 6.23E−09 | C(0, 7) | 3.38E−12 | C(2, 7) | −2.20E−16 |
| | C(2, 0) | 0.00360484 | C(0, 5) | 2.84E−09 | C(8, 0) | −2.59E−15 | C(0, 9) | 9.64E−17 |
| | C(0, 2) | 0.00061986 | C(6, 0) | 2.61E−11 | C(6, 2) | 3.13E−14 | C(10, 0) | 2.90E−20 |
| | C(2, 1) | 5.9071E−05 | C(4, 2) | −2.00E−10 | C(4, 4) | −9.77E−15 | C(8, 2) | −4.97E−19 |
| | C(0, 3) | 1.6888E−05 | C(2, 4) | 2.64E−12 | C(2, 6) | −2.15E−14 | C(6, 4) | 2.04E−18 |
| | C(4, 0) | −2.322E−07 | C(0, 6) | 2.00E−11 | C(0, 8) | 8.14E−15 | C(4, 6) | −2.90E−19 |
| | C(2, 2) | 7.5974E−07 | C(6, 1) | 1.25E−12 | C(8, 1) | −6.62E−17 | C(2, 8) | −8.62E−19 |
| | C(0, 4) | 2.7513E−07 | C(4, 3) | −2.09E−12 | C(6, 3) | 4.00E−16 | C(0, 10) | 4.21E−19 |

Also, as is shown in the vertical cross-section view of FIG. 3, the object surface, i.e., the display screen of the image display element 1 is inclined by −2.602 degrees to the optical axis of the lens optic system. The conditions of inclination and eccentricity upon each lens surface are shown in a Table 4.

In this table 4, "ADE" is a magnitude of the inclination within the surface parallel with the cross-section of FIG. 3, and the direction of the inclination is assumed to be positive when it rotates into the anticlockwise within the cross-section in the figure, and a unit thereof is degree. Also, "YDE" is a magnitude of the eccentricity, and the eccentricity is set up within the vertical cross-section surface of FIG. 3, into the direction perpendicular to the optical axis, and it is assumed to be positive directing into a lower side on the cross-section of the figure, and a unit is "mm". The inclination of the image display element 1 with respect to the lens optic system can be expressed with "ADE" and "YDE" on the surface S3 in the Table 4.

TABLE 4

| Surface | ADE(°) | YDE(mm) |
|---|---|---|
| S3 | 2.602 | −1.289 |
| S22 | 26.495 | −17.4 |
| S23 | 59.800 | 0.0 |
| S24 | −50.000 | 0.0 |

With the inclination and the eccentricity shown in the Table 4, the inclination and the eccentricity of the surface S3 are disposed on the inclined optical axis of the surface S3, including all of the surfaces including the surface S3 and thereafter. Thus, to the optical axis exiting from a center of the surface S0, i.e., the image display element 1, the surfaces after S3 are inclined by 2.602 into the anticlockwise direction (in addition, being offset upward by 1.298 mm on the vertical cross-section of FIG. 3), with this, the image display element is inclined, relatively, with respect to the lens optic system.

With the free curved surface mirror 4 shown by a mark S22 in FIG. 3, only the surface S22, i.e., the mirror surface thereof, is inclined and offset to the optical axis of the surface in front thereof. Thus, from the Table 4, it is indicated that only the surface S22 is inclined by 26.495 degree into the anticlockwise direction, and that it is offset upward by 17.365 mm, on the vertical cross-section of FIG. 3. With this, the central light beam on the image plane, exiting from the center of the image surface of the image display element 1 and propagating almost along the optical axis of the lens optic unit, after being reflected upon S22, propagates into the direction inclining by 50 to 60 degrees with respect to the incident light beam.

The surface S23 is an imaginary surface, which has a point of origin locating at the same position of the S22, before offsetting thereof. As is shown in the Table 4, surfaces from S22 up to S23 thereafter are disposed, inclining by +59.8 degrees. With this, it is possible to dispose the surface S24, i.e., the screen surface, in the direction, into which the light beams reflecting upon S22 directs. And, the surface S24, i.e., the screen surface, is on the optical axis inclined by +59.8 degrees after the surface S23, and is disposed inclining by −50 degrees with respect to the optical axis.

However, from the Table 1 and the Table 3, according to the embodiment 2, it can be seen that the curvature "c" and the conic coefficient "k" are set to zero (0). Thus, the trapezoidal distortion due to the inclined incident generates in the direction of that inclined incident, extremely large, but an amount of the distortion is small in the direction perpendicular to this. Accordingly, functions are necessary, which are greatly different from each other, in the direction of the inclined incident and the direction perpendicular to this, and it is possible to correct asymmetric aberration, preferably, without utilizing the curvature "c" and the conic coefficient "k", being rotationally symmetric and functioning in all direction.

Also, according to the embodiment 2, it is possible to project corresponding to the sizes from 60 inches (1219.2× 914.4 mm) to 100 inches (2032×1524 mm) by changing the projection distance, while setting the picture size on the display screen of the image display element 1, i.e., the object surface S0, 13.2×9.9 mm (ratio=4:3) and projecting the picture thereof onto an image surface S23, enlargedly, to 80 inches (1625.6×1219.2 mm with +over-scan), as the center of design.

In a Table 5 is shown changes of the distance between the surfaces, with respect to the lenses, which must be moved responding to change of this projection distance. In the Table 5, the distances between S15, S17, S19, S21 and S22 are changed responding to the charge of the projection distance, and the values thereof are shown, i.e., the value in case of the center of design (i.e., 80") below a column Sc1, the value in case of 100" below a column Sc2, and the value in case of 60" below a column Sc3, respectively.

TABLE 5

| | TH | | |
|---|---|---|---|
| Surface | Sc1 | Sc2 | Sc3 |
| S15 | 44.228 | 44.192 | 44.300 |
| S17 | 19.858 | 19.525 | 20.401 |
| S19 | 6.932 | 6.192 | 8.083 |
| S21 | 102.031 | 102.771 | 100.880 |
| S23 | −888.477 | −1124.755 | −652.884 |

Also, in the embodiment 2, since an angle "θs" (shown in FIG. 1), which is defined by the central light beam on the image plane and the normal ling of the projection surface, i.e., the angle of the oblique projection, is 55.6 degrees (1.2*sin θs=0.99), and since the value of the distance of optical length |L1−L2| expressed by (Eq. 1) is as 0.761 time large as the height of the image on the screen (i.e., the maximum value of those from that when 60" to that when 100", as was mentioned), this satisfies the condition of the equation 1.

Figure 15A:
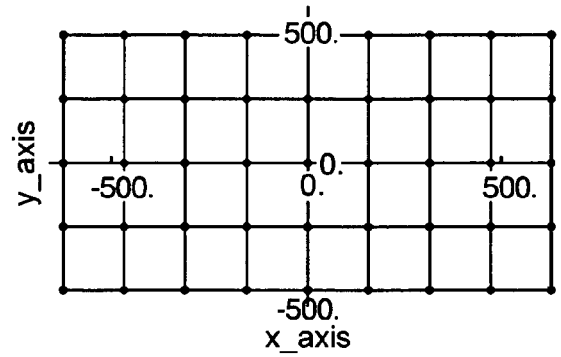
FIGS. 15(a) to 15(c) are views for showing picture distortion performances of the optical unit, according to the embodiment 2.
Figure 15B:
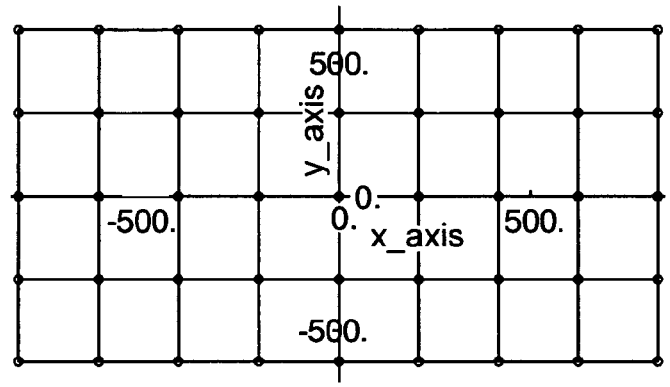
Figure 15C:
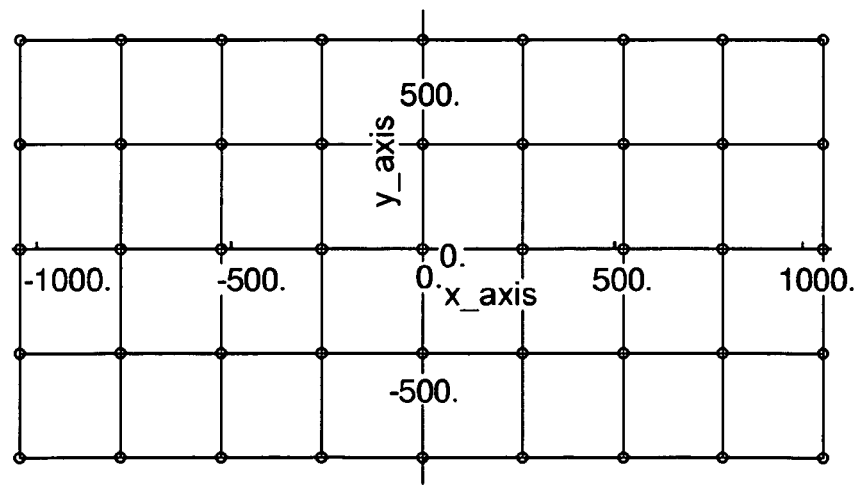

The picture distortions are shown in FIGS. 15(a) to 15(c), which are obtained according to the embodiment 2. The vertical direction in those FIGS. 15(a) to 15(c) corresponds to the vertical direction in FIG. 12, and also corresponds to the Y-axis in FIG. 1. Also, the horizontal direction in those FIGS. 15(a) to 15(c) corresponds to the direction perpendicular to the Y-axis on the screen, and the central portion in an oblong in the figure corresponds to the center of the image plane. However, those FIGS. 15(a) to 15(c) show the curvature condition of each line, in case when showing the image plane, dividing into four (4) in the vertical direction of the image plane while dividing into eight (8) in the horizontal direction thereof, and thereby showing the condition of the picture distortion. In FIGS. 15(a) to 15(c), the picture distortion is shown when the projection distance is that of the center of design (the screen size is 80"), in particular, in FIG. 15(b), the picture distortion when the projection distance is for the screen size is 60" in FIG. 15(a), and the picture distortion when the screen size is 100" in FIG. 15(c). As is shown in FIGS. 15(a) to 15(c), the picture distortion are corrected, preferably.

Figure 16:
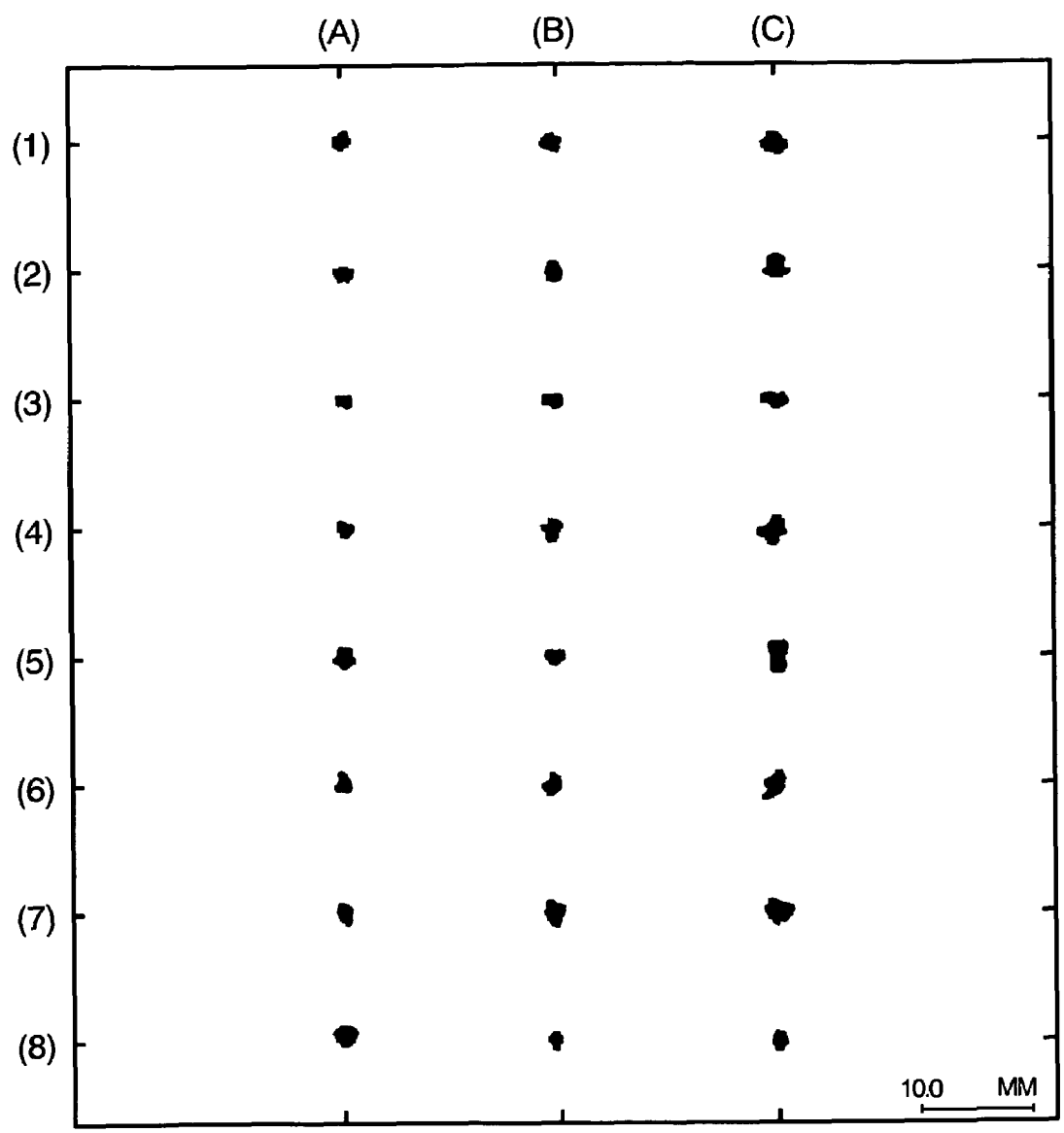
FIG. 16 is a view for showing spot performances of the optical unit, according to the embodiment 2.

Further, spot diagrams are shown in FIG. 16. In this FIG. 16 are shown the spot diagrams of light flux emitted from eight (8) points, i.e., (6.6, 4.95), (0, 4.95), (3.96, 2.97), (6.6, 0), (0, 0), (3.96, −2.97), (6.6, −4.95) and (0, −4.95) by the values of X-Y coordinates assuming the center of the display screen as the pint of origin thereof, in an order ((1) to (8)) from the upper. Further, the unit thereof is "mm". The horizontal direction of each spot diagram corresponds to the X direction on the screen, while the vertical direction corresponds to the Y direction. Also, in FIG. 16, (B) shows the spot when the projection distance is at the center of designing (i.e., the screen size 80"), (A) shows the spot when the projection distance is that for screen size 60", and (C) shows the spot when the projection distance is that for screen size 100", respectively.

As was mentioned above, according to the embodiment 2, there can be provided an optical unit, without necessity of the additional optic system of large aperture, since it is not necessary to offset the lenses to be used, as in the background art, and further enabling wide angle of the screen while suppressing the distortion down to the minimum even when changing the position of the screen, as well as, relatively easy in the manufacturing thereof. And, with using such the optical unit, it is possible to achieve the projection-type display apparatus, being excellent in performances and compact in the outer sizes thereof.

According to the present invention, it is possible to provide an optical unit and a projection-type display apparatus, for enabling the wide angle with the oblique projection, without necessity of the additional optic system of large aperture, while suppressing the distortion down to the minimum even when changing the position of the screen, and also reducing shifting of focus down to the minimum to the screen position adjustment by inclining the apparatus, as well as, relatively easy in the manufacturing thereof.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications that fall within the ambit of the appended claims.

What is claimed is:

1. A projection-type display apparatus, comprising:
   a front lens group having a plural number of lenses, each having a rotationally symmetric surface configuration;
   a rear lens group, being disposed in rear of said front lens group, including a refractive lens for diverting a light and having a rotationally symmetric surface configuration, and a plural number of free curved surface lenses, each having a rotationally asymmetric free curved surface configuration;
   a reflection mirror, being disposed in rear of said rear lens group, having a convex configuration into a direction of reflection of light and a rotationally asymmetric free curved surface configuration, at least in a part thereof;
   a first mounting table for mounting the refractive lens and a free curved surface lens of said rear lens group, so as to be movable in an optical axis direction, so that positional relationship between the refractive lens and free curved surface lens is settable into predetermined positions, respectively, depending on a projection distance; and
   a second mounting table for mounting said front lens group movable in an optical axis direction, so that the front lens group is disposed in a predetermined position with respect to said rear lens group, which is mounted on said first mounting table.

2. The projection-type display apparatus, as described in the claim 1, wherein
   on curvatures of a free curved surface lens disposed on a side of said reflection mirror among said plural number of free curved surface lenses, a curvature in a portion thereof, for passing through a light to be incident upon a lower end portion of a projection surface, upon which the light is projected from said reflection mirror, is larger than a curvature in a portion thereof, for passing through a light to be incident upon an upper portion of said projection surface.

3. The projection-type display apparatus, as described in the claim 2, wherein on curvatures of said reflection mirror, a curvature in a portion thereof, for reflecting the light thereupon to be incident upon the lower end portion of said projection surface, is larger than a curvature in a portion thereof, for reflecting the light thereupon to be incident upon the upper portion of said projection surface.

4. The projection-type display apparatus, as described in the claim 1, wherein
   on said reflection mirror, a portion thereof, for reflecting a light incident upon a lower end portion of said projection surface, has a convex configuration into a direction of reflection thereupon, and a portion thereof, for reflecting a light incident upon an upper end portion of said projection surface, has a concave configuration into the direction of reflection thereupon.

5. The projection-type display apparatus, as described in the claim 4, wherein the following relationship is satisfied, $$|L1-L2|<1.2*\sin\theta s*Dv$$

where "L1" is a distance of an optical path of the light, for guiding the light incident upon the upper end portion of said projection surface of said reflection mirror, from a portion for reflecting thereof to a portion for incident upon the upper end portion of said projection surface, "L2" is a distance of an optical path of the light, for guiding the light incident upon the lower end portion of said projection surface of said reflection mirror, from a portion for reflecting thereof to a portion for incident upon the lower end portion of said projection surface, "Dv" is a distance from the upper end portion of said projection surface to the lower end portion thereof, and "θs" is an angle defined between the light incident upon said reflection mirror at a central portion thereof and a normal line on said projection surface.

6. A projection-type display apparatus, as described in the claim 1,
   wherein said first mounting table is comprised of:
   a third mounting table for mounting the refractive lens, of said rear lens group, so as to be movable in an optical axis direction; and
   a fourth mounting table for mounting the free curved surface lens, of said rear lens group, so as to be movable in an optical axis direction, and
   said first mounting table is movable depending on a projection distance.

7. A projection-type display apparatus, comprising:
   a front lens group having a plural number of lenses, each having a rotationally symmetric surface configuration;
   a rear lens group, being disposed in rear of said front lens group, including a refractive lens for diverting a light and having a rotationally symmetric surface configuration, and a plural number of free curved surface lenses, each having a rotationally asymmetric free curved surface configuration;
   a reflection mirror, being disposed in rear of said rear lens group, having a convex configuration into a direction of reflection of light and a rotationally asymmetric free curved surface configuration, at least in a part thereof;

a first mounting table for mounting the refractive lens and a free curved surface lens of said rear lens group, where the refractive lens and the free curved surface lens are slidable within grooves provided within the first mounting table relative to movement of the first mounting table, to set a positional relationship between the refractive lens and free curved surface lens relative to each other in an optical axis direction, depending on a projection distance; and a second mounting table for mounting said front lens group movable in an optical axis direction, so that the front lens group is disposed in a predetermined position with respect to said rear lens group, which is mounted on said first mounting table.

* * * * *